United States Patent [19]
Saito

[11] 3,924,860
[45] Dec. 9, 1975

[54] PICK-UP ARM ASSEMBLY

[75] Inventor: Etsuro Saito, Atsugi, Japan

[73] Assignee: Sony Corporation, Tokyo, Japan

[22] Filed: Feb. 5, 1974

[21] Appl. No.: 439,828

[30] Foreign Application Priority Data

Feb. 17, 1973 Japan ................................ 48-19627

[52] U.S. Cl. .................. 274/1 L; 274/15; 274/23 A
[51] Int. Cl.² ............................................ G11B 3/10
[58] Field of Search ......................... 274/23, 1 L, 15

[56] References Cited

UNITED STATES PATENTS

| | | | |
|---|---|---|---|
| 1,866,403 | 7/1932 | Elmer | 274/23 A |
| 2,585,396 | 2/1952 | Martin | 274/23 A |
| 3,059,934 | 10/1962 | Urmenyi | 274/23 R |
| 3,388,912 | 6/1968 | Shimoda et al. | 274/23 R |
| 3,424,465 | 1/1969 | Hartog | 274/23 A |
| 3,476,394 | 11/1969 | Birch | 274/23 R |
| 3,494,623 | 2/1970 | Nestle | 274/23 R |
| 3,599,984 | 8/1971 | Kondo | 274/1 L |
| 3,622,163 | 11/1971 | Bachman | 274/23 A |
| 3,671,045 | 6/1972 | Barg | 274/15 R |
| 3,697,087 | 10/1972 | Takahashi | 274/23 R |
| 3,850,435 | 11/1974 | Birch | 274/23 A |

FOREIGN PATENTS OR APPLICATIONS

| | | | |
|---|---|---|---|
| 1,060,103 | 2/1967 | United Kingdom | 274/23 A |

*Primary Examiner*—Richard E. Aegerter
*Assistant Examiner*—John W. Shepperd
*Attorney, Agent, or Firm*—Lewis H. Eslinger; Alvin Sinderbrand

[57] ABSTRACT

A pick-up arm assembly comprising a pick-up arm carrying a stylus-holding member so that the length of the stylus-holding member intersects with the line connecting a fulcrum of the pick-up arm to the stylus at a given angle $\theta$, a rotary member supporting rotatably the pick-up arm at the fulcrum distant from its center to maintain the stylus-holding member in the direction tangengial to spiral recorded grooves of a recorded disc, detecting means for detecting whether a fixed point lies on the prolongation of the line connecting the fulcrum to the stylus or not, and control means for controlling the rotary member in cooperation with the decting means, whereby the tracking error is removed.

8 Claims, 26 Drawing Figures

PICK-UP ARM ASSEMBLY

BACKGROUND OF THE INVENTION

1. Field of the Invention

This invention relates to a pick-up arm assembly for disc records and more particularly to an improved high fidelity pick-up arm assembly so constructed and arranged as to maintain the stylus in contact with the recorded surface at the point of tangency and embodying numerous novel features.

2. Description of the Prior Art

In phonograph recording apparatus, the desired recording is performed in such a manner that the recording cutter moves linearly along the normal to the periphery of the disc to be recorded. Therefore, when a stylus moves along a circle having a center at a point outside of the record disc as in the pick-up arm assembly of conventional recorded reproducing apparatus, it is impossible to maintain the cartridge carrying the stylus in the direction tangential to the sound groove of the record disc throughout the record-playing. Consequently, in the phonograph reproducing apparatus having such a pick-up assembly, it is impossible to reproduce the sounds from the record disc with fidelity and so-called tracking error occurs.

To remove the tracking error, it is required to maintain the cartridge carrying the stylus in the direction tangential to the sound groove of the recorded disc throughout the record-playing.

In the conventional method for that purpose, the base end of the pick-up arm is attached to spiral advancing means which is arranged over or outside of the turning table to linearly move the base end of the pick-up arm and to move the stylus carried by the pick-up arm in the direction of the diameter of the recorded disc.

However, in the conventional method, the means to advance the pick-up arm is complicated and the range of movement of the pick-up arm is large, and therefore the method is not suitable for the small-size of the apparatus and for general consumers.

FIG. 1 shows the theory of another conventional method for the prevention of the tracking error. In this method, because the pick-up arms is linear, it is impossible to maintain $\angle XSO$ at the right angle unless the effective length of the pick-up arm or the position of the line PS widely varies to correct the tracking error throughout the record-playing or ranging from the maximum diameter to the minimum diameter, of the recorded surface of the disc. Therefore, the larger and complicated mechanism is required to vary widely the effective length of the pick-up arm. And when the recorded disc is eccentric, it is required to vary the effective length of the pick-up arm each time and the variations cause the wow and flutter. Moreover, in the pick-up assembly shown by FIG. 1, it is required to move the axis center P of the arm supporting shaft with the movement of the stylus S by the movable member so as always to put the fixed point X, the axis center P of the arm supporting shaft and the stylus S on the straight line and to remove the tracking error thereby. Therefore, one driving source is required to move the movable member. Moreover, another driving source is required to actuate the lead-in and lead-out mechanism, by which the pick-up arm automatically leads in the position of the beginning of the record-playing and automatically leads out from the position of the end of the record-playing. Consequently, as the one driving source to drive the movable member and the other driving source to actuate the lead-in and lead-out mechanism must be separately arranged in the conventional method, it has the disadvantage that plural driving sources are required.

Moreover, when the pick-up arm is automatically moved to the position of the beginning of the record-playing, the lead-in position of the pick-up arm must be automatically changed according to the size of the recorded disc, because the position of the beginning of the record-playing differs with the size of the recorded disc in the phonograph reproducing apparatus.

In the pick-up arm assembly in which the pick-up arm is supported at the fixed point, the operation for presetting the lead-in position can be performed according to the size of the recorded disc by simpler arrangements, while in the pick-up arm assembly in which the supporting member for the pick-up arm is moved by the movable member so as to remove the tracking error, the operation for presetting the lead-in position must be performed according to the size of the recorded disc by complicated arrangements.

And in the above-mentioned pick-up arm assembly, pick-up arm memory apparatus is known in which the lead-in and lead-out positions of the pick-up arm are memorized automatically to lead in and lead out the pick-up arm to and at the desired positions of the recorded disc.

In this pick-up arm memory apparatus, the rotary member rotates with the pick-up arm, and the range of the rotation of the rotary member is regulated. Therefore, an external force is applied to the pick-up arm by the regulation of the rotary member, so that the operation of the pick-up arm is badly affected. Consequently, the apparatus has the disadvantage that the frictional force between the stylus and the sound groove of the recorded disc is increased.

SUMMARY OF THE INVENTION

An object of the present invention is to provide a novel pick-up arm assembly removing the above-mentioned disadvantages.

A further object of the present invention is to provide a pick-up arm assembly comprising a pick-up arm carrying a stylus-holding member so that the length of the stylus-holding member intersects with the line connecting a fulcrum of the pick-up arm to the stylus at a given angle $\theta(0° < \theta < 90°)$, a rotary member supporting rotatably the pick-up arm at the fulcrum distant from its center to maintain the stylus-holding member in the direction tangential to spiral recorded grooves of a recorded disc, detecting means for detecting whether a fixed point lies on the prolongation of the line connecting the fulcrum to the stylus or not, and control means for controlling the rotary member in cooperation with the detecting means, whereby the tracking error is removed.

A still further object of the present invention is to provide a pick-up arm assembly comprising a rotary member supporting a pick-arm, a driving source, driving means for transmitting the driving force of the driving source to the rotary member through frictional members and control means for the pick-up arm operated by the driving means, the common driving source operating the rotary member and the control means, whereby only one driving source is required, the rotary member and the control means can be operated without the complicated change-over of the transmission of the driving force, moreover the assembly is simple in construction and sure in operation.

A still further object of the present invention is to provide a pick-up arm assembly with a size-preset apparatus, comprising a rotary member supporting a pick-up arm, control means for moving the pick-up arm in accordance with the movement of the rotary member and means for moving previously the rotary member to a given position corresponding to the size of the recorded disc, whereby the operation for the size-preset can be surely performed by a simpler arrangement.

A still further object of the present invention is to provide a pick-up arm assembly in which no external force by the memory apparatus is applied to the pick-up arm in the condition that the tracking error is effectively prevented.

A still further object of the present invention is to provide a pick-up arm assembly in which the lead-in of the pick-up arm is performed by the apparatus preventing the tracking errror of the pick-up arm on the recorded disc, and therefore which is simple in construction and sure in operation.

A still further object of the present invention is to provide a pick-up arm assembly with means for detecting the last groove of the recorded disc.

The foregoing and other objects, features and advantages of the present invention will be more readily understood upon consideration of the following detailed description of preferred embodiments of the present invention, taken in conjunction with the accompanying drawings.

DESCRIPTION OF THE PREFERRED EMBODIMENTS

Figure 1:
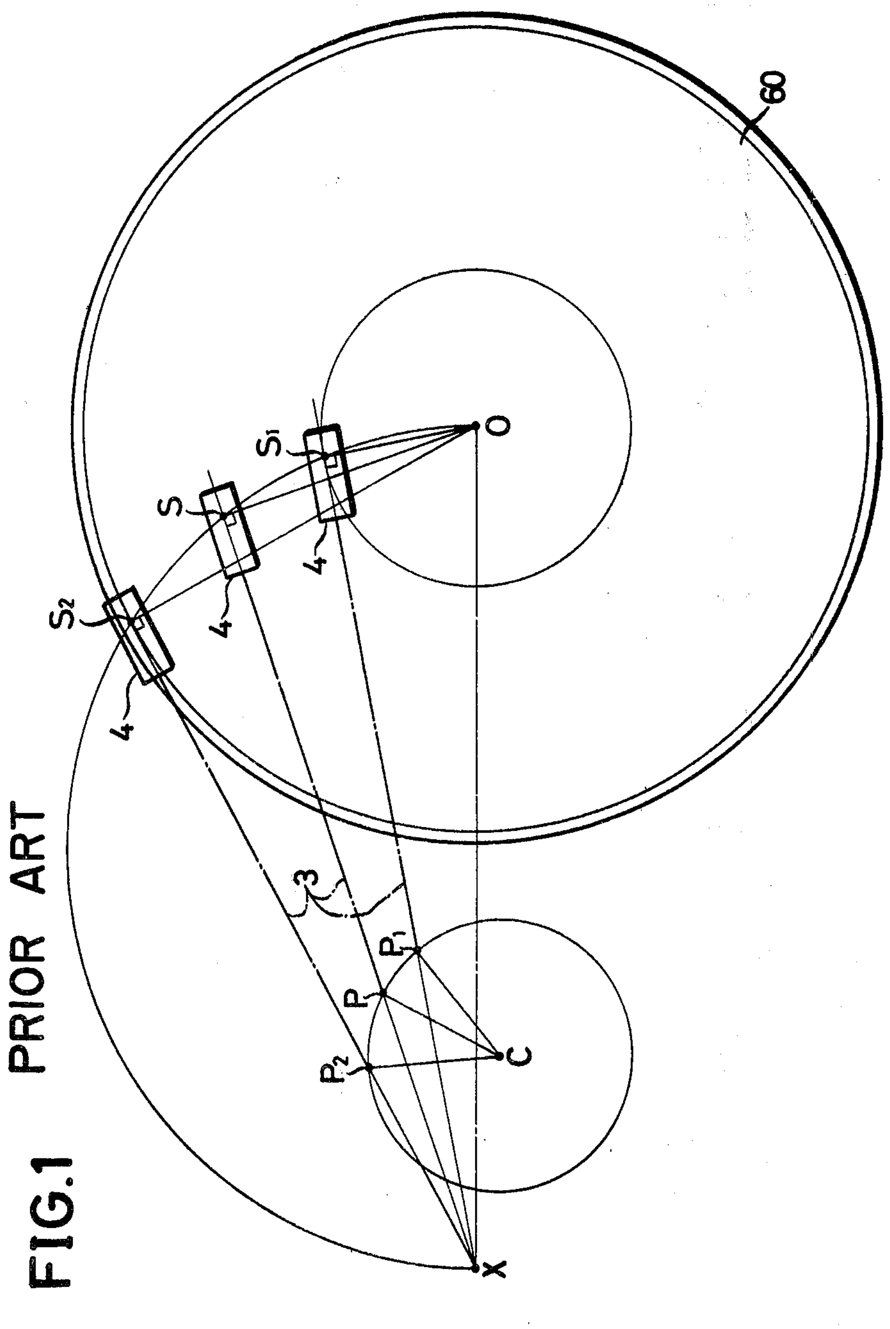
FIG.1 PRIOR ART
FIG. 1 is a sketch illustrating the theory on which the prior pick-up arm assembly is based.
Figure 2:
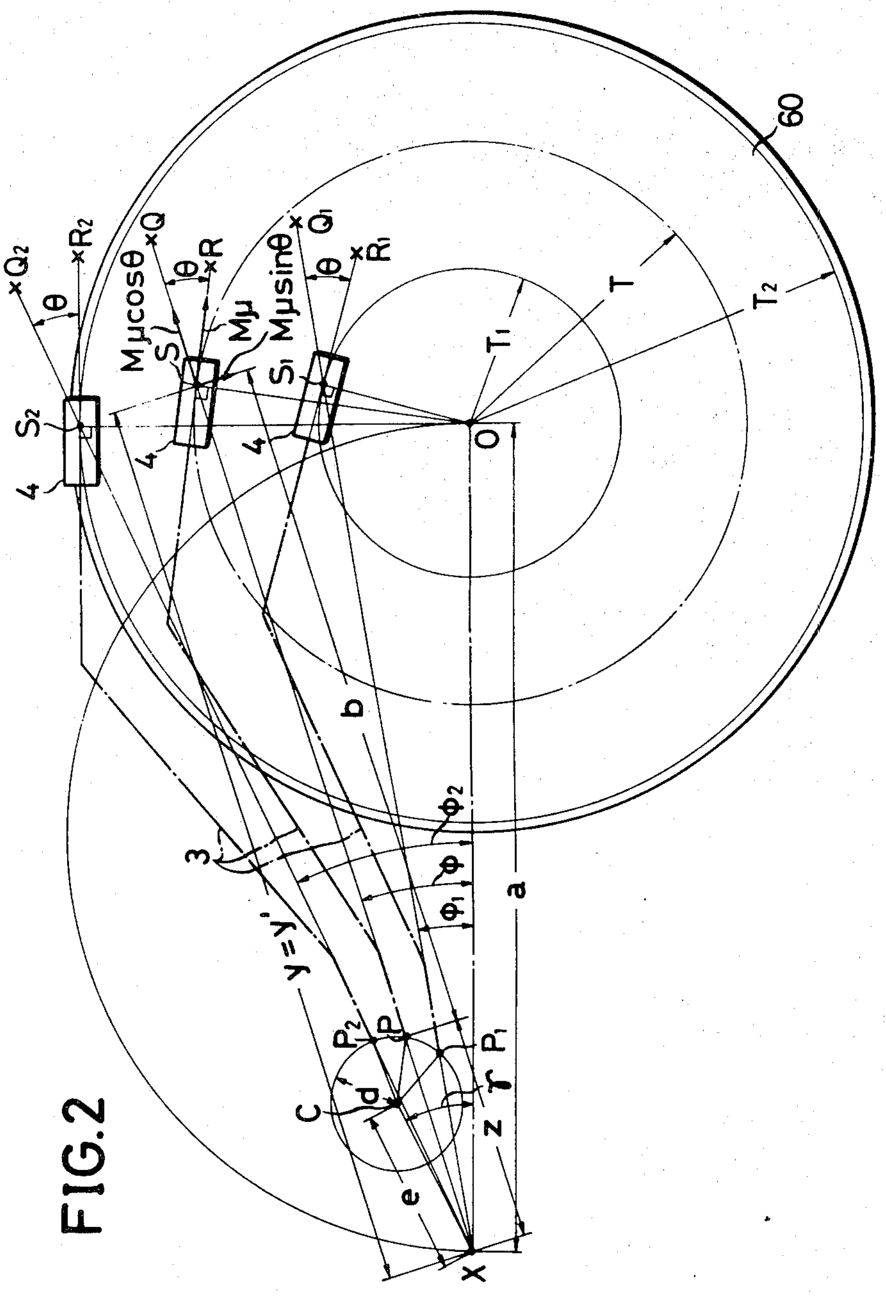
FIG. 2 is a sketch illustrating the theory on which the invention is based.

In FIG. 2 illustrating the theory of the invention, O represents the center of a recorded disc 60, X a point outside of the recorded disc 60, S a position of a stylus, Q a point on the prolongation of the line XS, and the line SR a line tangential to the sound groove of the recorded disc 60 at the point S.

$$\angle QSR = \text{constant} \quad (1)$$

When the above formula (1) holds for arbitrary positions of the point S, a pick-up arm assembly can be obtained in which no tracking error occurs.

The conditions in which the formula (1) holds, are as follows:

Where XO=$a$ (constant), XS=$y$, $\angle$SXO=$\phi$ and the angle QSR=$\theta$, $\angle$RSO=90° and then $$\angle OSX = 180° - 90° - \theta = 90° - \theta \quad (2)$$

Therefore, $$\angle SOX = 90° - (\phi - \theta) \quad (3)$$

And by the sine rule on ΔSXO $$\frac{y}{\sin(<SOX)} = \frac{a}{\sin(<OSX)} \quad (4)$$

When the formulas (2) and (3) are substituted in the formula (4), $$\frac{y}{\sin\{90° - (\phi - \theta)\}} = \frac{a}{\sin(90° - \theta)}$$

$$y = a\frac{\sin\{90° - (\phi - \theta)\}}{\sin(90° - \theta)} = a\frac{\cos(\phi - \theta)}{\cos\theta} \quad (5)$$

The formula (5) represents the relationship between $y$ and $\phi$, $\theta$ and $a$.

Figures 3, 11:
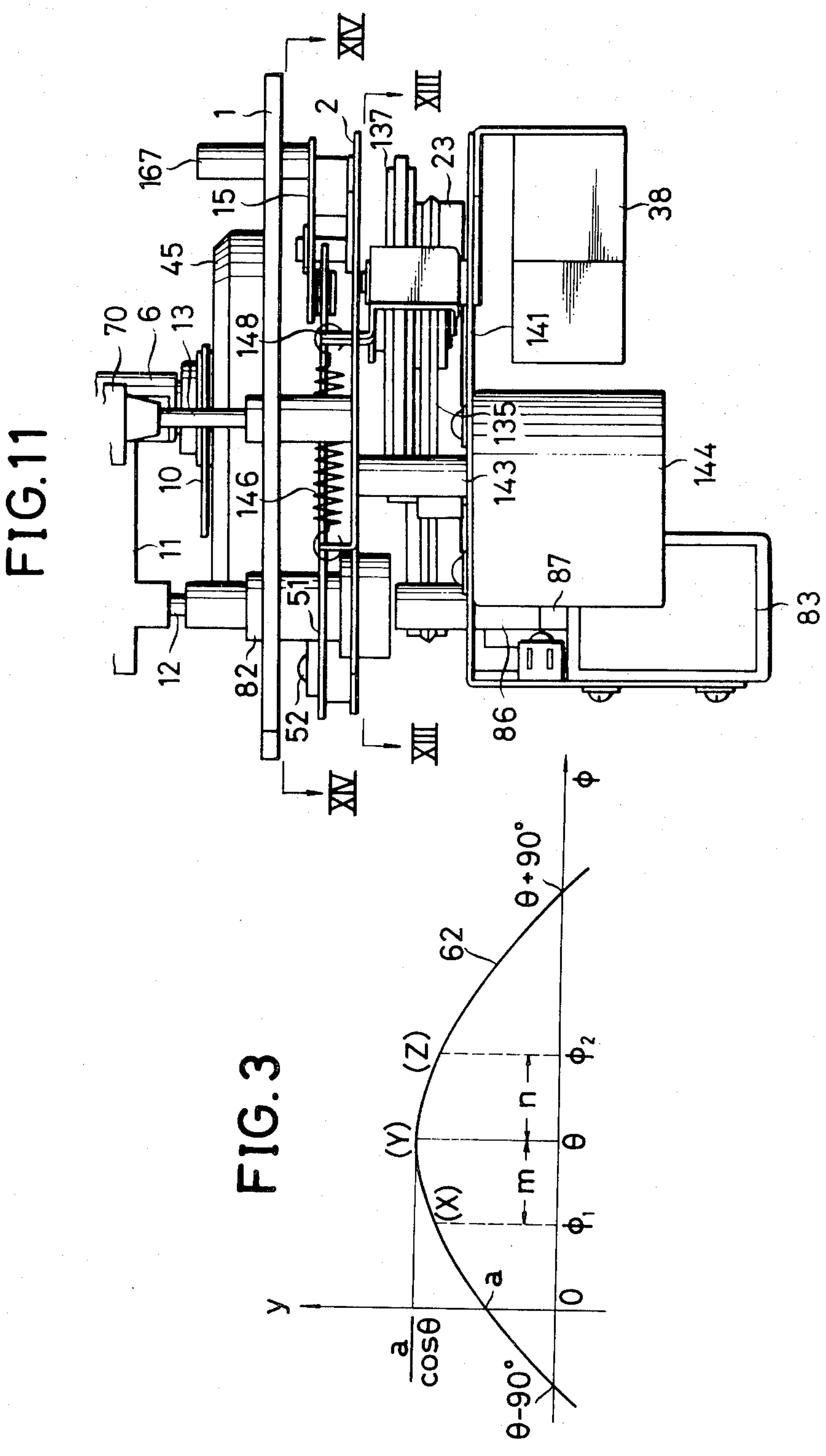
FIG. 3 and FIG. 4 are graphs explaining the theory of the invention illustrated in FIG. 2.
FIG. 11 is a side view of the pick-up arm assembly shown in FIG. 5.

When the angle $\theta$ is constant in the formula (5), the value $y$ produces the characteristic of non-tracking error. FIG. 3 shows the graph of the formula (5). The range of the variations of the angle $\phi$ is determined by the maximum angle $\phi_2$ and the minimum angle $\phi_1$ corresponding with the maximum redius $T_2$ and the minimum radius $T_1$ of the sound groove of the recorded disc.

And by the sine rule on ΔSXO $$\frac{T}{\sin\phi} = \frac{a}{\cos\theta} \qquad (6)$$

From the formula (6), the following general formula (7) is obtained $$\phi = \sin^{-1}\left(\frac{T}{a}\cos\theta\right) \qquad (7)$$

Therefore, the minimum angle $$\phi_1 = \sin^{-1}\left(\frac{T_1}{a}\cos\theta\right) \qquad (8)$$

and the maximum angle $$\phi_2 = \sin^{-1}\left(\frac{T_2}{a}\cos\theta\right) \qquad (9)$$

As apparent from the formula (5) and FIG. 3 showing the graph of the formula (5), when the angles $\theta$ and $a$ are constant, the value $y$ varies approximately to a cosine curve.

When $m$ represents the difference between the angles $\phi_1$ and $\theta$ and $n$ represents the difference between the angles $\theta$ and $\phi_2$, a ratio of $m$ to $n$ $$\frac{m}{n} = \frac{\theta - \phi_1}{\phi_2 - \theta} \qquad (10)$$

From the formula (10), $$\theta = \frac{m\phi_2 + n\phi_1}{n + m} \qquad (11)$$

is obtained. When the formulas (8) and (9) are substituted in the formula (11), $$\theta = \frac{1}{m+n}\left\{m\cdot\sin^{-1}\left(\frac{T_2}{a}\cos\theta\right) + n\cdot\sin^{-1}\left(\frac{T_1}{a}\cos\theta\right)\right\} \qquad (12)$$

is obtained. From the formula (12), the angle $\theta$ is determined. It is preferable that the rate of the variation of the value $y$ to that of the angle $\phi$ is as little as possible, from the view point of mechanism. As apparent from FIG. 3, it is desirable to make $m$ equal to $n$ in order to lessen the rate of the variation of the value $y$. That is to say, when $$\theta = \tfrac{1}{2}(\phi_1 + \phi_2) \qquad (13)$$

the rate of the variation of the value $y$ is the least in the range from the angle $\phi_1$ to the angle $\phi_2$. As apparent from the formula (12), $$\theta = \frac{1}{2}\left\{\sin^{-1}\left(\frac{T_2}{a}\cos\theta\right) + \sin^{-1}\left(\frac{T_1}{a}\cos\theta\right)\right\} \qquad (14)$$

is the most desirable relationship. Therefore, it is practical to determine the angle $\theta$ by the formula (14).

The preferred embodiments relate to the pick-up arm assembly having a novel arrangement fulfiling the formula (5), that is to say, to the pick-up arm assembly having a novel arragnement with the characteristic shown in FIG. 3.

In the preferred embodiments, a cartridge 4 is inclined at the angle $\theta$ to the line PS connecting the fulcrum P of the pick-up arm 3 (the center of the axis supporting the pick-up arm 3) to the stylus S, and the points S, P and X are maintained so as to lie on a straight line, whereby the cartridge 4 is maintained in the direction tangential to the sound groove of the recorded disc 60 and the point P is rotated around the fixed point C with the movement of the stylus S.

By such an arrangement of the invention, the length of the line PC is reduced to the minimum.

In FIG. 2, a link CP supported rotatably at the fixed point C is connected to a link PS supported rotatably at the point P. It is preferrable that an oblong hole is made at the position corresponding to the fixed point X of the link PS so that the link PS can slide in its longitudinal direction.

In FIG. 2, where the length of the line CX is $e$, that of the line CP $d$, that of the line PS $b$, that of the line PX $z$ and CXO $\gamma$ (the points C, X and O are fixed), by the cosine rule on ΔPCX $$d^2 = z^2 - 2ze\cdot\cos(\phi-\gamma) + e^2 - d^2 \qquad (15)$$

The formula (15) is a quadratic equation of $z$. From the equation (*15*), $$z = e\cdot\cos(\phi-\gamma) \pm \sqrt{d^2 - e^2\cdot\sin^2(\phi-\gamma)} \qquad (16)$$

is obtained. In the solution (16), as $e\cdot\cos(\phi-\gamma) - \sqrt{d^2-e^2\cdot\sin^2(\phi-\gamma)}$ is not practical, $e\cdot\cos(\phi-\gamma) + \sqrt{d^2-e^2\cdot\sin(\phi-\gamma)}$ is used.

Therefore, where the length of the line SX is $y'$, $$y' = \overline{PS} + \overline{XP} = z + b = e\cdot\cos(\phi-\gamma) + \sqrt{d^2 - e^2\cdot\sin^2(\phi-\gamma)} + b \qquad (17)$$

Figures 4, 12:
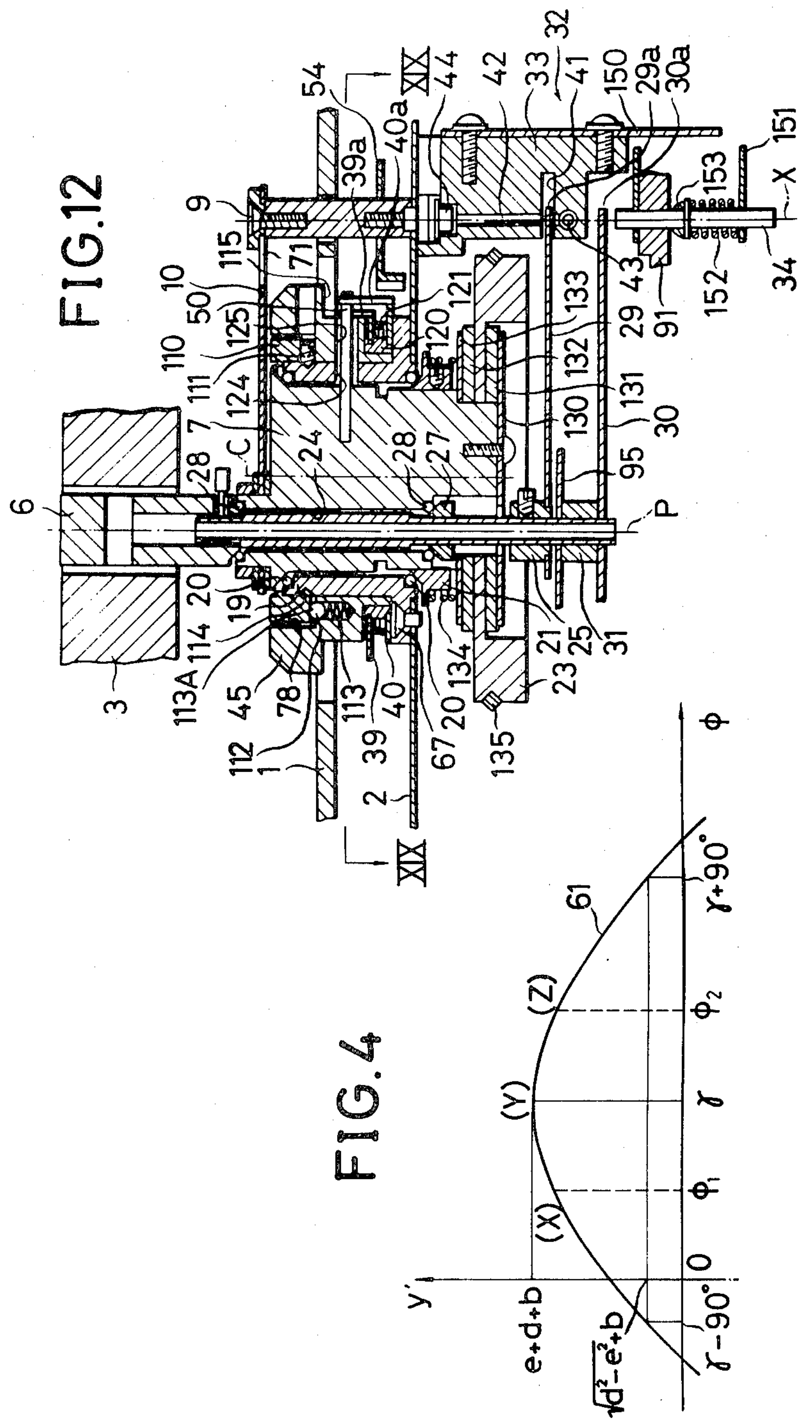
FIG. 12 is a cross-sectional view of the pick-up assembly taken along the lines XII—XII of FIG. 5.

FIG. 4 shows the graph of the formula (17). The curve 61 in FIG. 4 is very similiar to the curve 62 of the formula (5) in FIG. 3. If the locus of the stylus S represented by the curve 61 corresponds to the locus of the stylus S represented by the curve 62, no tracking error occurs. In other words, if the $y$-characteristic curve 62 of the formula (5) corresponds to the $y'$-characteristic curve 61 of the formula (17), no tracking error occurs. All factors are determined in such a manner that three points X, Y and Z in FIG. 4 correspond to three points X, Y and Z in FIG. 3, respectively in order to approach the $y$-characteristic curve to the $y'$-characteristic curve as near as possible in the range $\phi_1 \leqq \phi \leqq \phi_2$.

For that purpose, the following formulas must hold:

$$\theta = \gamma \qquad (18)$$

$$y_{\phi=\theta} = y'_{\phi=\gamma} \qquad (19)$$

$$y_{\phi=\phi_1} = y'_{\phi=\phi_1} \qquad (20)$$

$$y_{\phi=\phi_2} = y'_{\phi=\phi_2} \qquad (21)$$

As $y_{\phi=\phi_1} = y_{\phi=\phi_2}$, and $y'_{\phi=\phi_1} = y'_{\phi=\phi_2}$, the formula (21 ) naturally holds, if the formulas (18), (19) and (20) hold. Therefore, the $y'$-characteristic curve corresponds perfectly to the $y$-characteristic curve at the three points X, Y and Z.

From the formulas (19), (5) and (18), $$\frac{a}{\cos\theta} = e + d + b \qquad (22)$$

is obtained.

And from the formulas (20), (5) and (18), $$\frac{a \cdot \cos(\phi_1-\theta)}{\cos\theta} = e \cos(\phi_1-\theta) + \sqrt{d^2-e^2\sin^2(\phi_1-\theta)} + b \quad (23)$$

is obtained.

As all of the four values *a*, *b*, *d* and *e* cannot be obtained from the two formulas (22) and (23), the two values are arbitrarily determined and the two formulas (22) and (23 ) are solved for the remaining two values. By the determination of all factors fulfilling the formulas (22) and (23), the locus of the point S in FIG. 2 is approached close to the locus represented by the formula (5), and moreover the former corresponds perfectly to the latter at the three points (X), (Y) and (Z).

By the theory of the pick-up arm assembly according to the above-mentioned embodiment, the pick-up arm assembly with the characteristic nearly fulfilling the equation (5) for the no tracking error can be obtained.

Next, the numerical values will be shown for the factors according to the above-mentioned theory.

Where the distance a between the fixed point X and the center O of the recorded disc 60 is 280 mm, and the minimum radius $T_1$ and the maximum radius $T_2$ and 60 mm and 145 mm, respectively, the angle $\theta$ is calculated at 20°19′ from the formula (6) by the trail-and-error method. The angles $\phi_1$ and $\phi_2$ are calculated at 11°35′ and 20°3′ from the formulas (8) and (9), respectively. Where the distance *e* between the fixed point X and the fixed point C is 69 mm, the distance *b* between the center P of the axis supporting the pick-up arm and the stylus S, and the distance *d* between the fixed point C and the center P, are calculated from the formulas (12) and (13) as follows:

$b = 207.7$ mm $d = 21.8$ mm

The relationship between the grade of the approximation $\Delta y = |y-y'|$ and the angle $\phi$ is shown in the following table.

| $\phi$ | y mm | y′mm | Δy mm |
|---|---|---|---|
| 11°35′ | 295.11 | 295.10 | 0.01 |
| 12° | 296.14 | 296.16 | 0.02 |
| 15° | 297.29 | 297.31 | 0.02 |
| 17° | 298.07 | 298.08 | 0.01 |
| 19° | 298.49 | 298.49 | 0.00 |
| 20°19′ | 298.57 | 298.57 | 0.00 |

As apparent from the above table, $\Delta y_{max}$=0.02mm. The numerical value 0.02mm is extremely small and can be within the range of the allowable error of the normal machine work. The influence of the value $\Delta y$=0.02mm on the angle $\theta$ in the formula (1) is as follows:

Where $\Delta\theta$ is the infinitesimal change of the angle $\theta$, $$\frac{\Delta y}{\Delta\theta} = \frac{a \cdot \sin\phi}{\sin^2\theta}$$

and therefore $$\Delta\theta = \frac{\sin\theta}{a \cdot \sin\phi}\Delta y \quad (24)$$

Where $\phi$ = 11°35′, and $\theta$ = 20°19′in the formula (24), $$\Delta\theta_{max} = \frac{(0.34721)^2 \times 0.02}{280 \times 0.20079} \times \frac{180}{3.14} = \frac{2°}{1000}$$

Consequently, the angle $\theta$ is influenced extremely little.

According to the above theory, the following inside force I is applied to the stylus S as shown in FIG. 2, which is the moment of force at the stylus S with respect to the center P of the axis supporting the pick-up arm:

$$I = bM\mu \cdot \sin\theta\phi \quad (25)$$

As the inside force I is constant, it can be very easily and accurately cancelled or maintained at a given value in the pickup arm assembly based on the above theory.

MECHANISM

The preferred embodiments of the invention based on the theory illustrated in FIG. 2 will be described with reference to FIGS. 5–25.

First, the mechanical construuction of the preferred embodiments will be described with reference to FIGS. 5–21.

Figure 5:
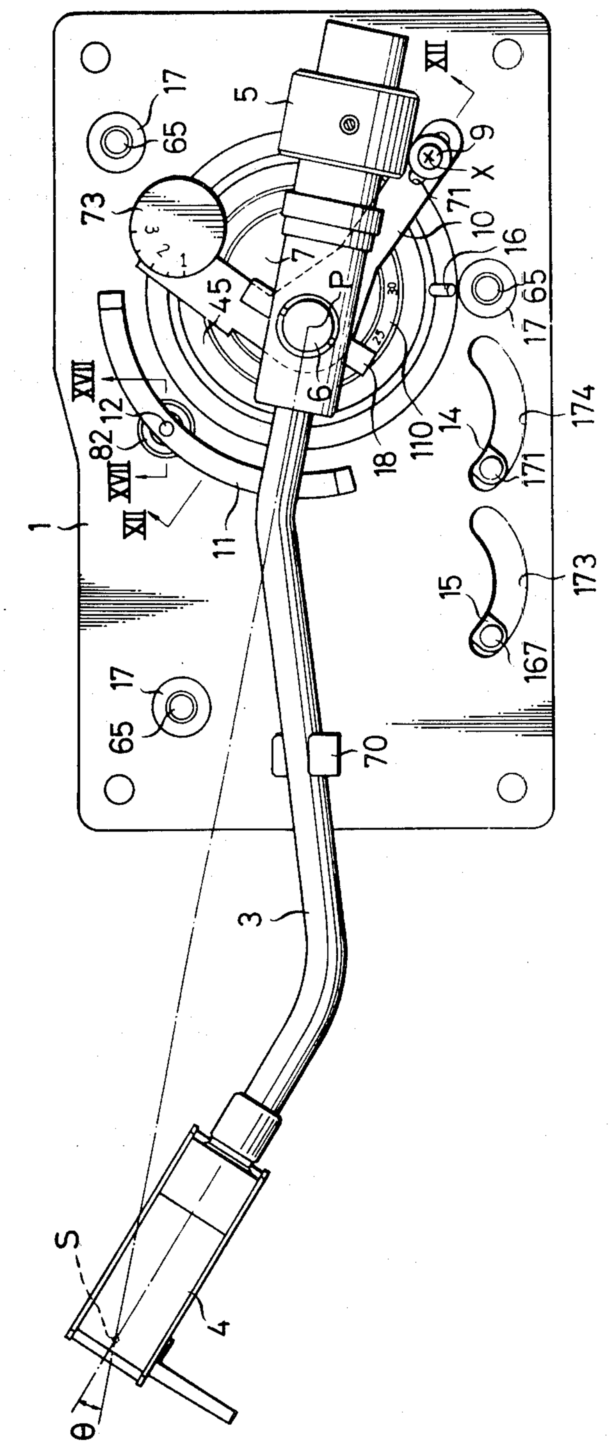
FIG. 5 is a top plan view of a pick-up arm assembly of the invention in the non-operating state.
Figure 6:
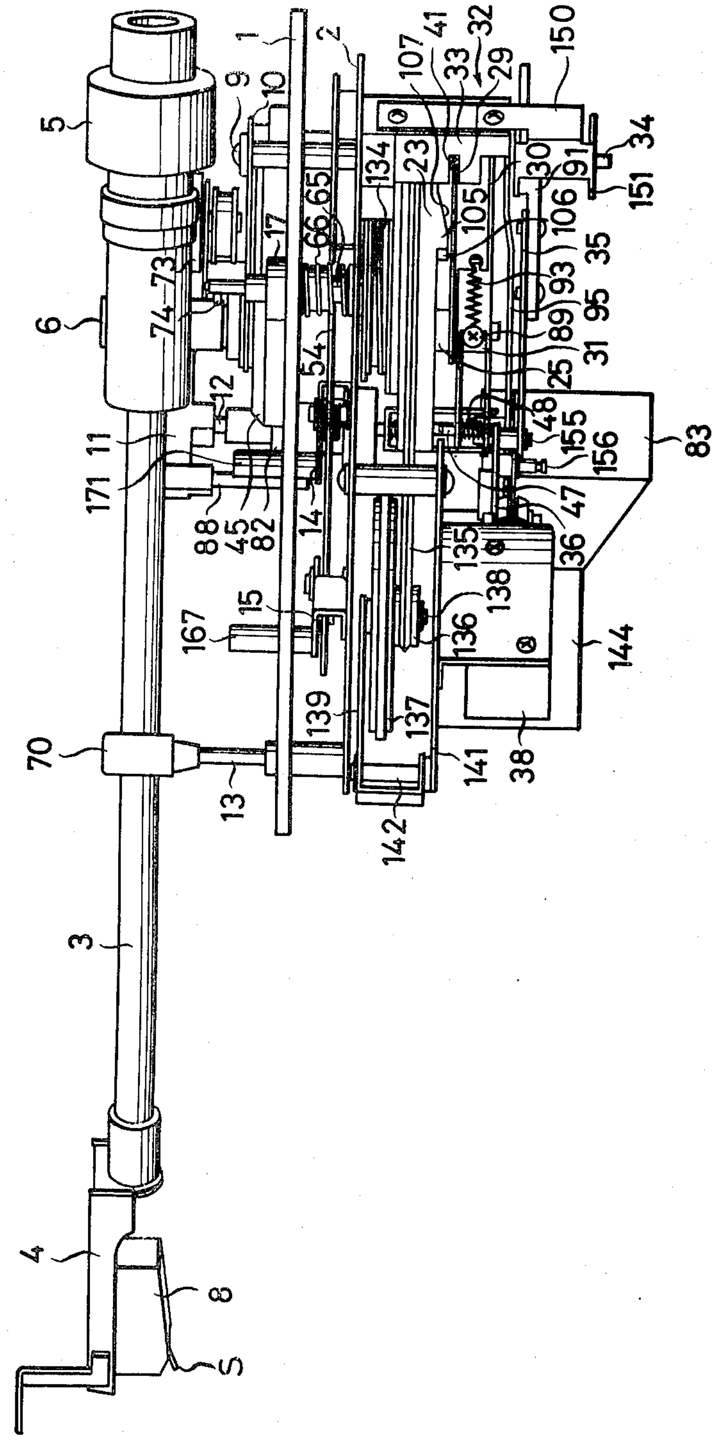
FIG. 6 is a front view of the pick-up arm assembly shown in FIG. 5.

As shown in FIG. 5, FIG. 6 and FIG. 12, a second frame 2 is fixed to a first frame 1 by three sets of male screws 65 and adjusting femaale screws 17 so as to be nearly parallel with the first frame 1. Since the male screw 65 is inserted into a coil spring 66 compressed between the first frame 1 and the second frame 2, the parallelism and the level of the second frame 2 relative to the first frame 1 can be adjusted by the winding of the adjusting female screw 17.

As shown in FIG. 12, a cylindrical member 19 is fixed to the second frame 2 by screws 67. A columnar rotary member 7 is inserted into the cylindrical member 19. A thrust nut 21 is fixed to the lower end of the rotary member 7. Thrust bearings 20 are disposed between the nut 21 and the lower end of the cylindrical member 19, and between the upper end of the rotary member 7 and the upper end of the cylindrical member 19, respectively, so that the rotary member 7 is supported rotatably at the cylindrical member 19.

As shown in FIG. 12, an inserting hole 24 is made at the position distant from the center C of the axis of the rotary member 7. An arm supporting shaft 6 is inserted into the hole 24, which is supported in the rotary member 7 rotatably around the center P of the axis by a pair of a thrust bearing 28 and a thrust nut 27.

As shown in FIG. 5 and FIG. 6, the base end portion of a pick-up arm 3 is mounted at the upper end of the arm supporting shaft 6 by means of a pivot axis 18 so as to be rotatable in the vertical direction and to rotate with the shaft 6 in the horizontal direction. At the top end of the pick-up arm 3, a cartridge holding member 4 carrying demountably a stylus holder or a cartridge 8 is formed, and at the base end of the pick-up arm 3, a counter weight 5 for adjusting the stylus pressure is mounted. The pick-up arm 3 is bent as shown in FIG. 5. And the cartridge 8 or the cartridge holding member 4 is arranged at the angle $\theta$ to the line PS connecting the center P of the axis of the arm supporting shaft 6 to the stylus S. An arm holder 13 having a U-shaped holding member 70 is fixed to the second frame 2, passing through the first frame 1, on which the pick-up arm 3 is held, as occasion demands.

As shown in FIG. 5 and FIG. 12, a L-shaped arm 10 is rotatably supported at the upper end of the columnar rotary member 7. An oblong hole 71 is made at one end of the arm 10. A fixed point pin 9 is inserted into he oblong hole 71, which is fixed to the second frame 2, passing through the first frame 1.

Figures 15, 16, 17, 18:
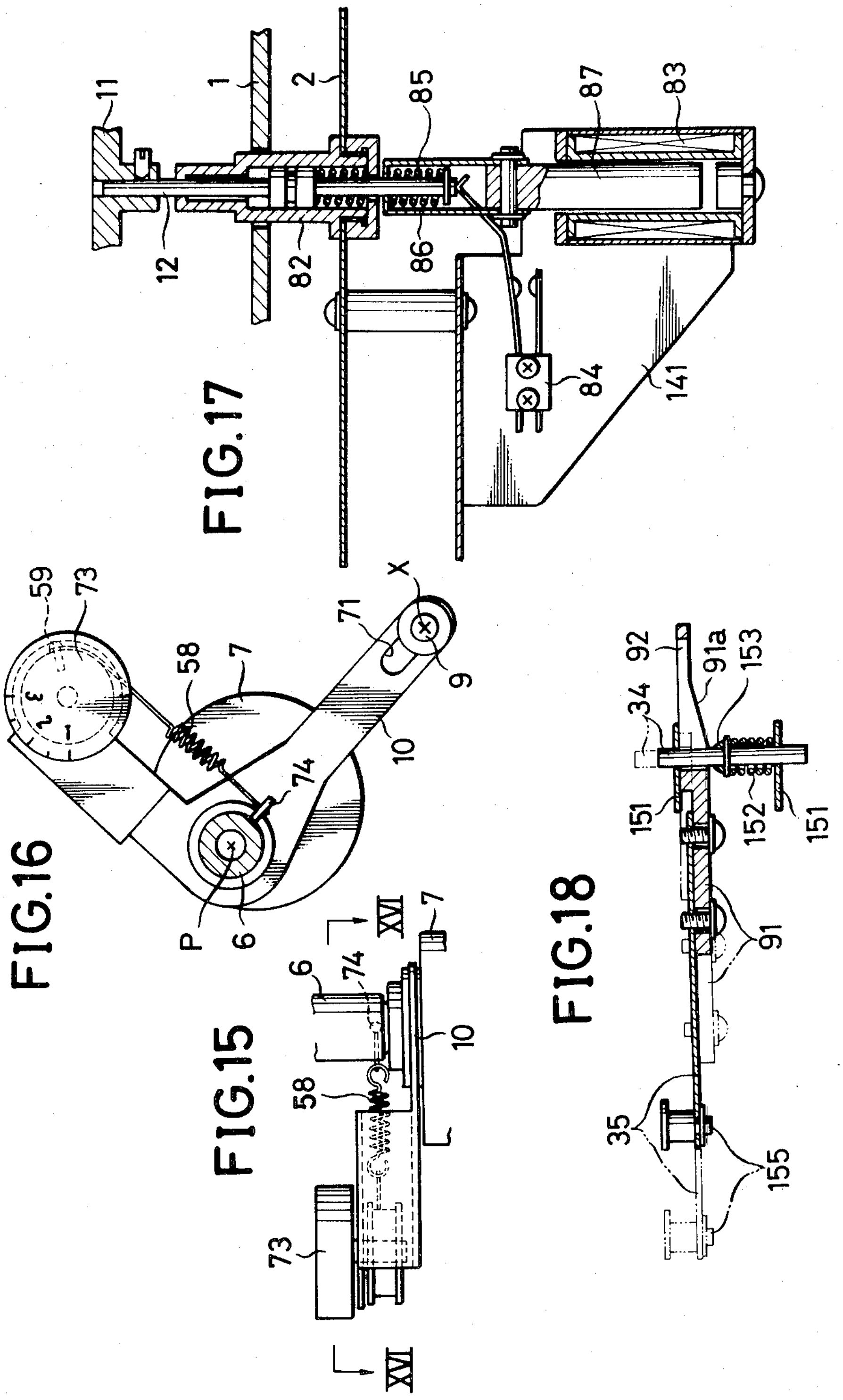
FIG. 15 is a front view of means for adjusting an inside force.
FIG. 16 is a cross sectional view of the means taken along the lines XVI—XVI of FIG. 15.
FIG. 17 is a cross-sectional view of the pick-up arm assembly taken along the lines XVII—XVII of FIG. 5.
FIG. 18 is a cross-sectional view of the pick-up arm assembly taken along the lines XVIII—XVIII of FIG. 7.

As shown in FIG. 5, FIG. 15 and FIG. 16, a dial knob 73 for adjusting the inside force is rotatably supported at another end of the L-shaped arm 10. One end of a coil spring 58 is fixed to a bolt 59 fixed at the dial knob 73, and another end of the coil spring 58 is fixed to a pin 74 fixed at the arm supporting shaft 6, so that the arm supporting shaft 6, therefore the pick-up arm 3 is anticlockwise urged by the coil spring 58 in FIG. 5. The urging force can be adjusted by the rotation of the dial knob 73, and therefore the inside force of the stylus S can be suitably adjusted by the rotation of the dial knob 73. As apparent from the above-mentioned formula (25), the inside force I is maintained constant throughout the recordplaying, and therefore the inside force I can be set at a given value.

As shown in FIG. 5 and FIG. 12, a size-preset ring 45 is fitted rotatably to the cylindrical member 19. A positioning ring 110 is inserted into a ring groove 78 formed at the inner surface of the upper end of the ring 45. The positioning ring 110 is fixed to the cylindrical member 19 by a screw 111. A positioning ball 112 is disposed at the size-preset ring 45, which is pressed to the lower surface of the positioning ring 110 by a coil spring 113. Three positioning concaves 113*a* are formed on the lower surface of the ring 110. The ball 112 can be fitted selectively to the positioning concaves 113*a*. The three concaves 113*a* correspond to three kinds (diameters: 17cm, 25cm and 30cm) of the sizes of the recorded disc 60 respectively.

A desired size-preset operation can be performed in such a manner that a size-preset ring 45 is rotated by an operating pin 16 fixed to the size-preset ring 45 and the operating pin 16 is set to the desired dial-scale (17, 25 or 30) to fit the ball 112 to the desired positioning cancave 113*a*. The top end of the screw 111 is fitted to a ring groove 114 formed on the cylindrical member 19. The screw 111 can be loosed in such a manner that a screw-driver is inserted into a hole 115 formed on the size-preset ring 45, and then the positioning ring 110 can be rotated relatively to the cylindrical member 19. By the rotation, the position of the positioning ring 110, and therefore the position of the positioning concave 113*a* can be adjusted. Even after the pick-up arm 3 is attached to the arm supporting shaft 6, the size-preset ring 45 positioned by the positioning ball 112 and the positioning concave 113*a* can be finely adjusted.

Figure 20:
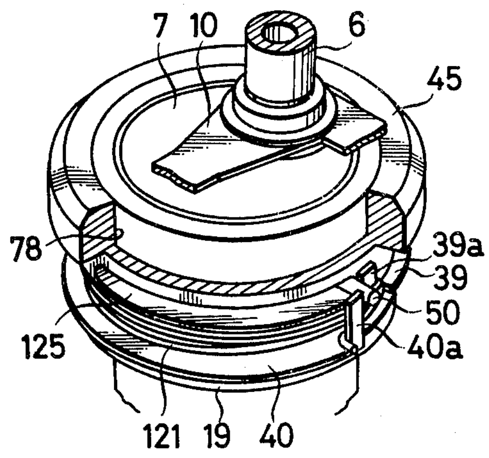
FIG. 20 is a perspective view of a main part of a memory device.

As shown in FIG. 12 and FIG. 20, a guide ring 120 is fitted to the lower end portion of the preset ring 45. A ring lead-in memory plate 39 and a ring lead-out memory plate 40 are rotatably arranged at the outer surface of the ring 120 opposite to each other.

Figure 14:
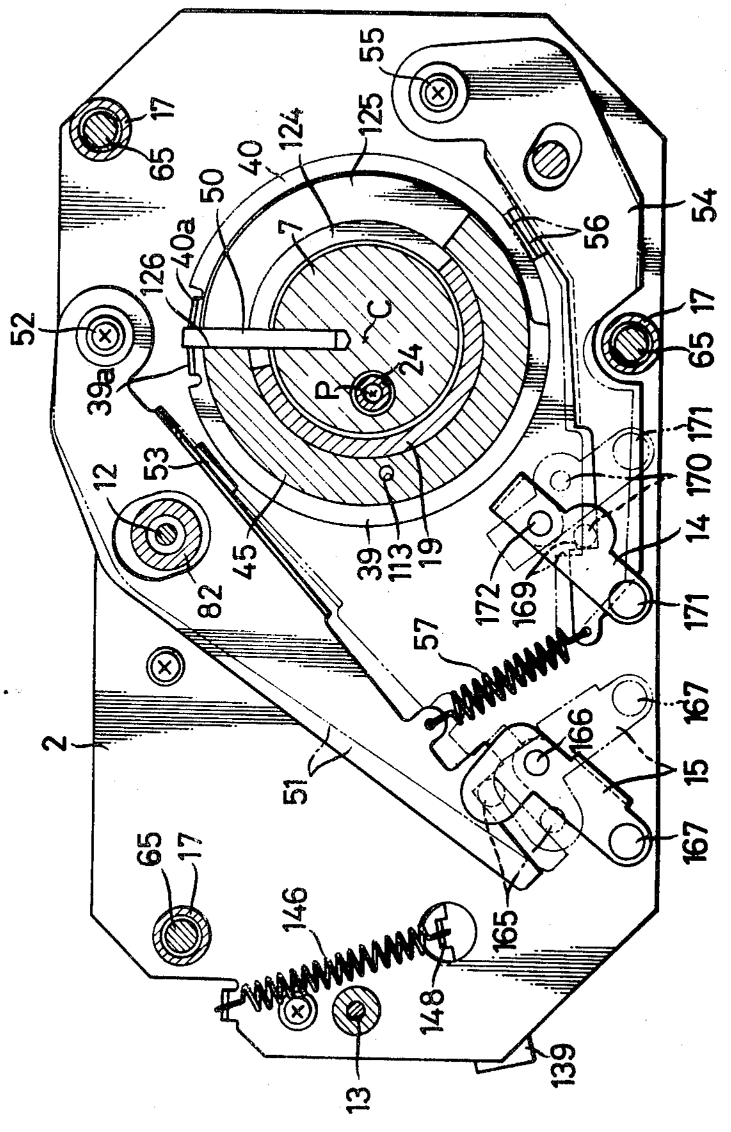
FIG. 14 is a cross-sectional view of the pick-up arm assembly taken along the lines XIV—XIV of FIG. 11.

As shown in FIG. 20, projections 39*a* and 40*a* are formed on the memory plates 39 and 40, respectively, and ends of a coil spring 121 are fixed to the projections 39*a* and 40*a*, respectively. The projections 39*a* and 40*a* are clockwise and anticlockwise urged by the coil spring 121 in FIG. 14, respectively. Therefore, a stopper pin 50 fixed to the columnar rotary member 7 is elastically nipped between the projections 39*a* and 40*a*. As shown in FIG. 14, the stopper pin 50 extends passing through an oblong hole 124 formed on the cylindrical member 19 and an oblong hole 125 formed on the size-preset ring 45. A stopping portion 126 of the oblong hole 125 regulates the anticlockwise rotation of the stopper pin 50 in FIG. 14. The position of the oblong hole 125 or the stopping portion 126 can be changed with the rotation of the preset-ring 45, and therefore the terminal position of the anticlockwise rotation of the stopper pin 50 can be changed.

Figure 13:
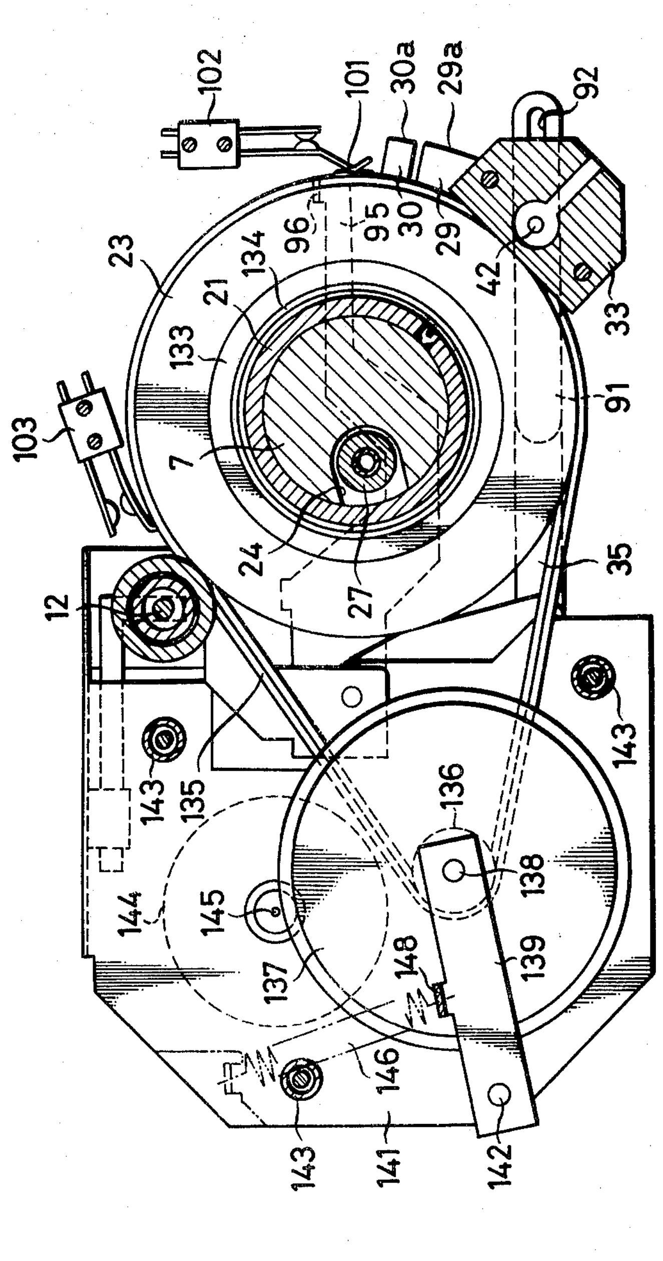
FIG. 13 is a cross-sectional view of the pick-up arm assembly taken along the lines XIII—XIII of FIG. 11.

As shown in FIG. 12, a felt mounting plate 130 is fixed to the bottom surface of the columnar rotary member 7 by screws. A friction plate 131 made of felt, an idle pulley 23, a friction plate 132 made of felt and a felt mounting plate 133 are piled on the felt mounting plate 130 in order. Since the felt mounting plate 133 is pressed downwards by a coil spring 134, the idle pulley 23 is nipped by a pair of friction plates 131 and 132. A belt 135 is wound around the idle pulley 23. As shown in FIG. 13, the belt 135 is wound also around an intermediate pulley 136 on which an idler 137 is formed as one body. A rotary shaft 138 of the pulley 136 and the idler 137 is supported rotatably at one end of a supporting lever 139. Another end of the supporting lever 139 is supported rotatably at a mounting pin 142 fixed between the second frame 2 and an ancillary frame 141. (See FIG. 6). The ancillary frame 141 is fixed to the second frame 2 by three pins 143. A projection 148 is formed on the supporting lever 139, to which one end of a coil spring 146 is fixed. Another end of the coil spring 146 is fixed to a projection of the second frame 2. An electric motor 144 is mounted at the ancillary frame 141. The idler 137 is pressed elastically to a shaft 145 of the electric motor 144 by the coil spring 146.

Figure 7:
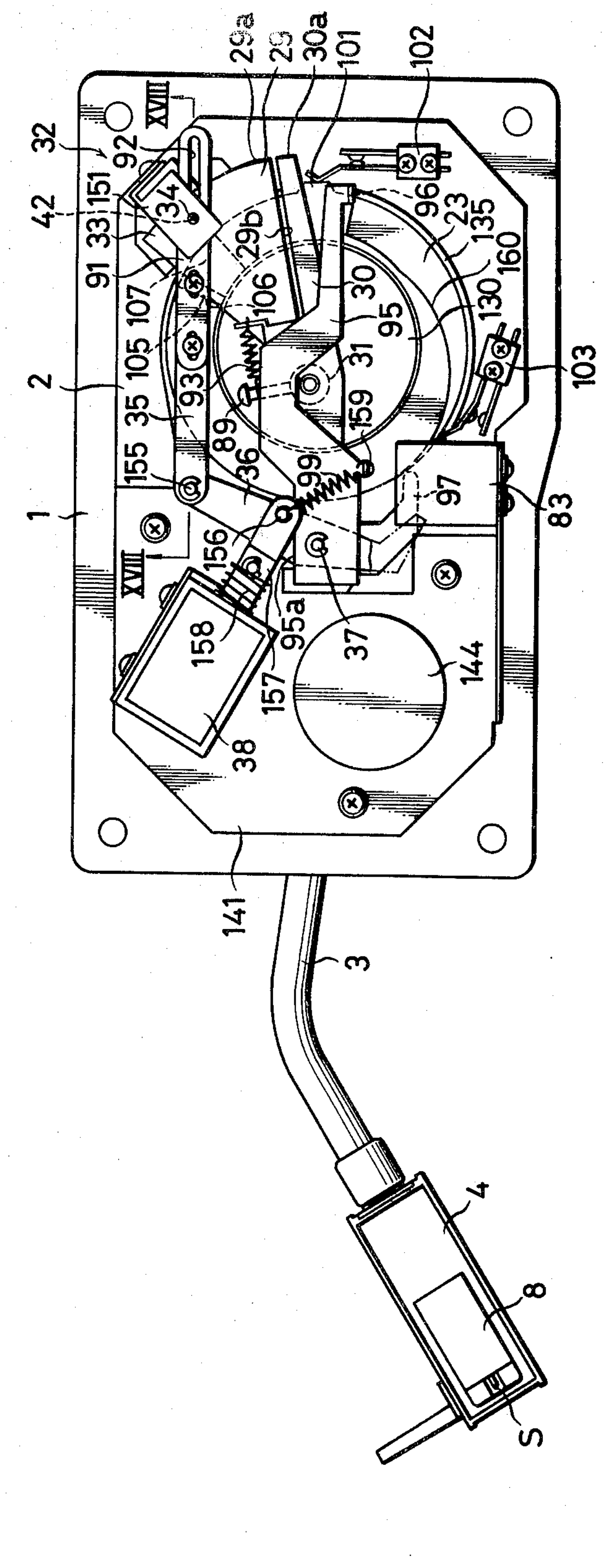
FIG. 7 is a bottom view of the pick-up arm assembly shown in FIG. 5.
Figure 8:
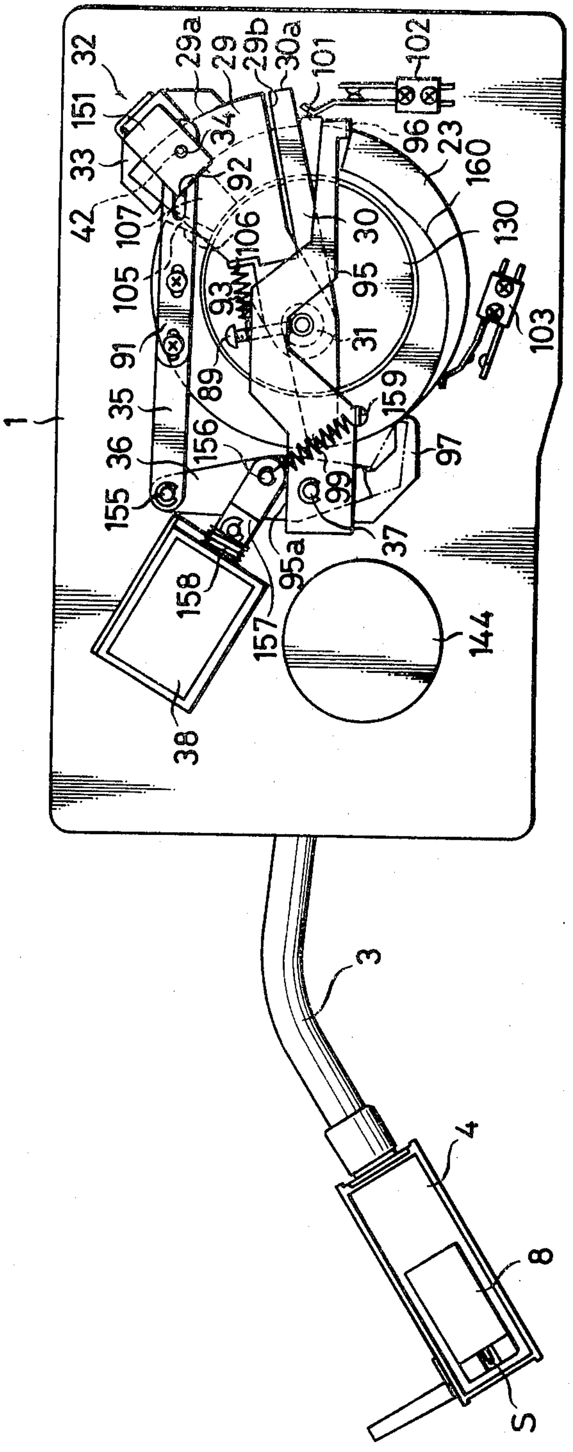
FIG. 8 is a bottom view of the pick-up arm assembly shown in FIG. 5 at the instant of the forward movement of a lead-in plunger to begin the lead-in operation.

As shown in FIG. 6 and FIG. 12, a sector shutter plate 29 is fixed at the lower end portion of the arm supporting shaft 6 through a mounting boss 25 and a first lead-in arm 30 is fixed at the lower end portion of the arm supporting shaft 6 through a mounting boss 31. As shown in FIG. 7, the first lead-in arm 30 is urged anti-clockwise by a coil spring 93 in FIG. 7. One end of the coil spring 93 is fixed to a bolt 89 attached to the boss 31.

As shown in FIG. 6 and FIG. 12, a fixed-point detecting means 32 is arranged corresponding with a top end portion 29*a* of the sector shutter plate 29. The fixed point detecting means 32 is provided with a detecting block 33 fixed to the lower surface of the second frame 2 by screws. A long hole 42 is made in the block 33 so as to be on the prolongation of the axis of the fixed-point pin 9, that is to say, so as to be at the center X of the rotation of the pick-up arm 3. A light sensitive element 44 such as CdS and a lamp 43 for a light source are arranged at the upper end and the lower end of the hole 42, respectively. A cut-out slit 41 is formed near the lower end of the hole 42. The top end portion 29*a* of the sector shutter plate 29 is selectively inserted into the slit 41 to shut the light from the lamp 43 to the light sensitive element 44.

As shown in FIG. 6, FIG. 12 and FIG. 18, a mounting plate 150 is fixed to the detecting block 33 by screws, and a stopper 34 is inserted into a U-shaped part 151 of the mounting plate 150. The stoppper pin 34 is inserted into an oblong hole 92 formed on a cam portion 91 of an operating arm 35 and into a coil spring 152. And the coil spring 152 is disposed between a flange 153 fixed to the stopper pin 34 and the lower side of the U-shaped part 151. Therefore, the stopper pin 34 is always urged upwards in FIG. 18 by the spring 152. The cam portion 91 has a taper protion 91*a* tapered to the top end of the operating arm 35, so that the stopper pin 34 moves up and down with the forward and backward movements of the cam portion 91. The stopper pin 34 lies on the prolongation of the axis of the fixed-point pin 9, that is to say, lies on the center X of the rotation of the pick-up arm 3. The upper end of the stopper pin 34 projects over the upper side of the U-shaped part 151 and is opposed to the top end portion 30*a* of the first lead-in arm 30. When the stopper pin 34 moves upwards, it works to stop the first lead-in arm 30.

Figure 9:
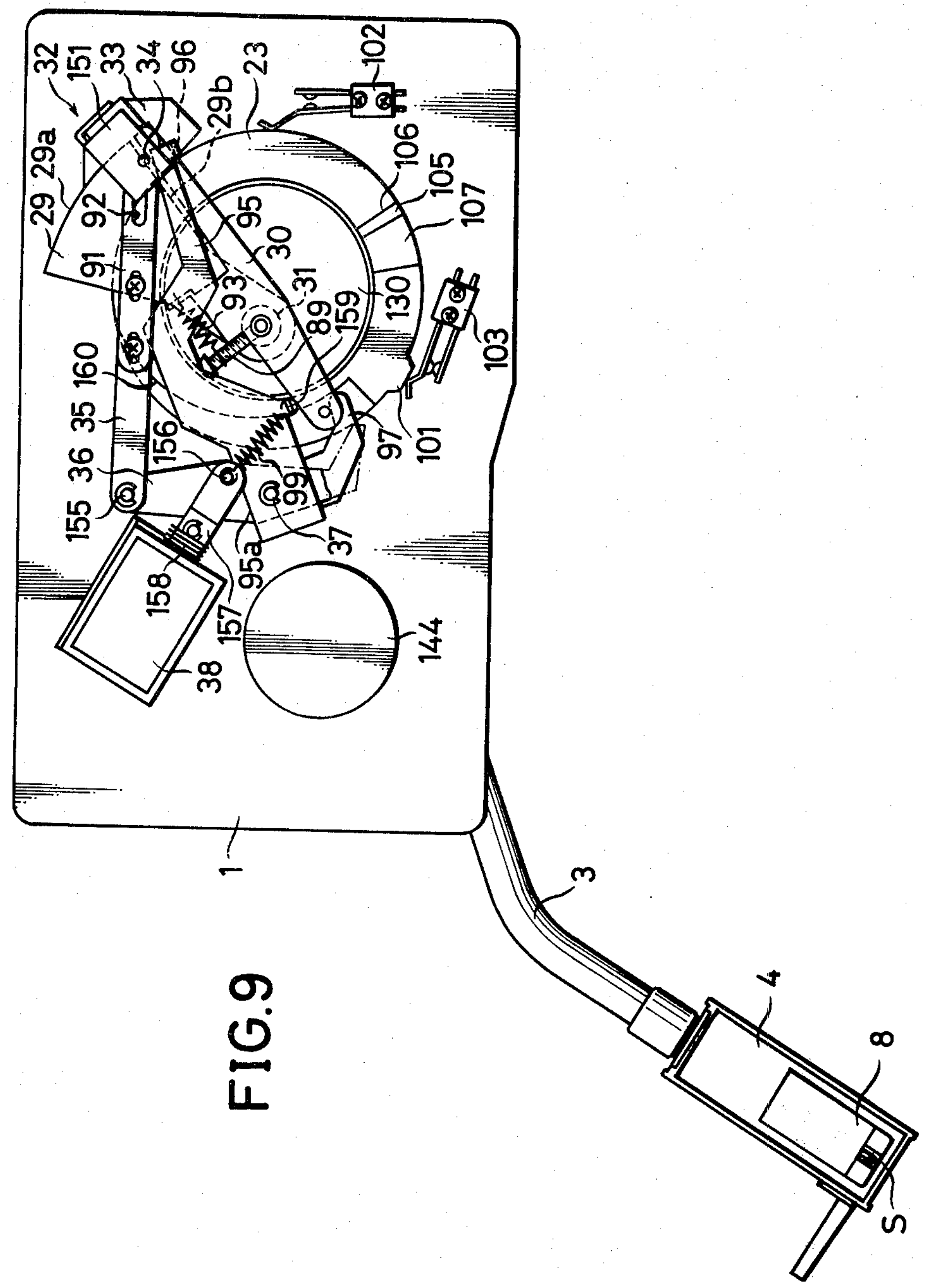
FIG. 9 is a bottom view of the pick-up arm assembly shown in FIG. 5 after the lead-in operation is finished and immediately before the lead-in plunger begins to move backwards.

As shown in FIG. 6 and FIG. 7, the base end of the operating arm 35 is rotatably supported at one end of another operating arm 36 by a pin 155, and the center portion of the operating arm 36 is supported rotatably relatively to the ancillary frame 141 by a supporting pin 37. Also a second lead-in arm 95 is rotatably supported at the supporting pin 37. On the operating arm 36, a connecting pin 156 is fixed between the pin 155 and the supporting pin 37. Through the connecting pin 156, a plunger 157 of a lead-in plunger solenoid 38 is connected to the operating arm 36. The plunger solenoid 38 is attached to the ancillary frame 141, and the plunger 157 is inserted into a coil spring 158 to be restored thereby. A tracing member 97 is formed on one end of the second lead-in arm 95, contacting with a cam member 160 formed on the outer periphery of the idler pulley 23. An engaging member 96 projedting upwards is formed on another end of the second lead-in arm 95 extending near to the top end 30*a* of the first lead-in arm 30, and it is designed to be engaged with the top end of the first lead-in arm 30. A fixing member 159 projecting downwards is formed on the second lead-in arm 95. One end of a coil spring 99 is fixed to the fixing member 159 and another end of the coil spring 99 is fixed to the connecting 156. As shown in FIG. 6 and FIG. 9, a pair of parallel plates are formed on another end of the first lead-in arm 30. An engaging pin 47 is arranged so as to be movable in the vertical direction, passing through the pair of parallel plates, and it is urged upwards by a coil spring 48.

Figure 10:
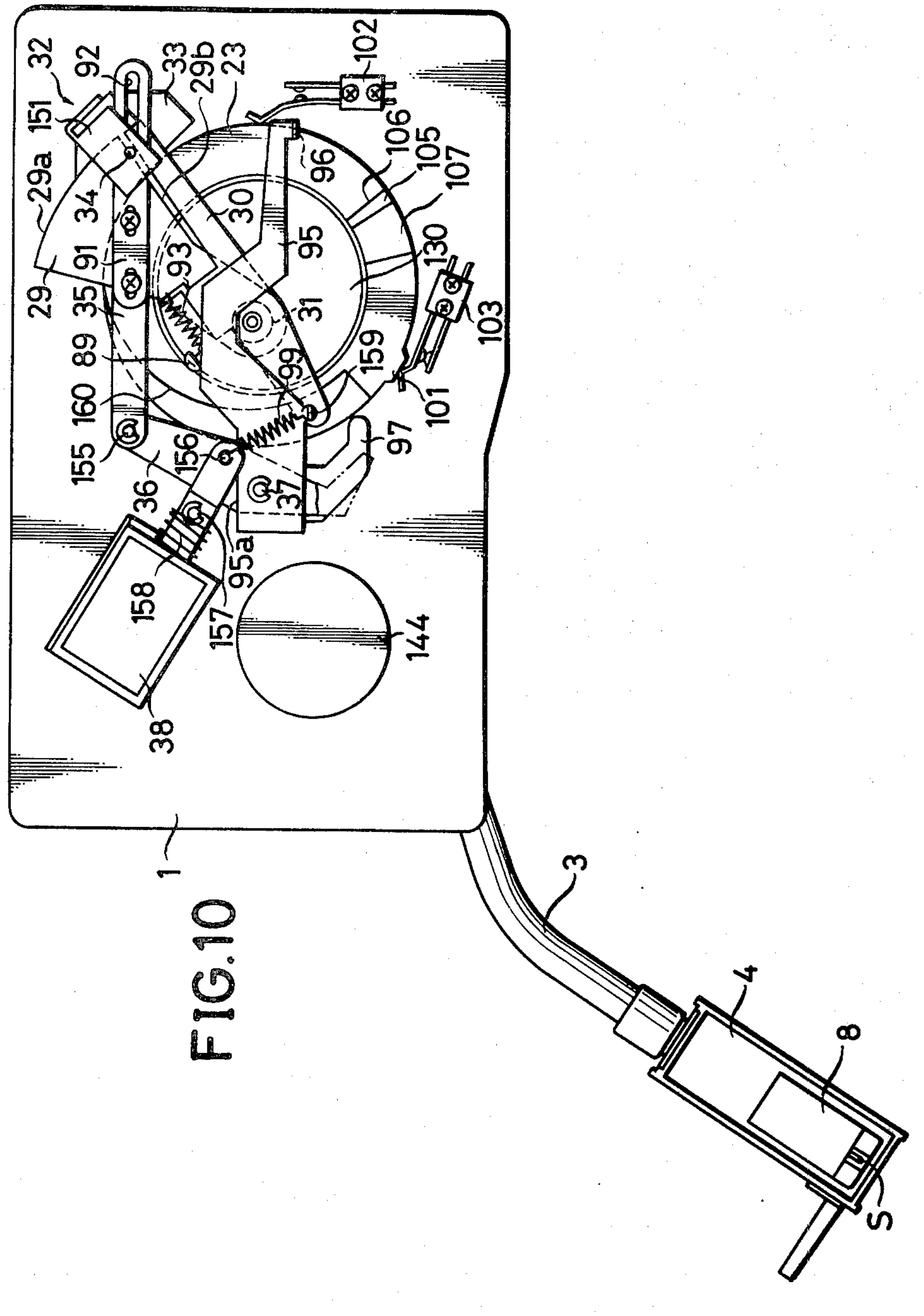
FIG. 10 is a bottom view of the pick-up arm assembly shown in FIG. 5 after the lead-in operation is finished and the lead-in plunger has moved backwards.

As shown in FIG. 6, FIG. 9 and FIG. 10, an engaging portion 105 is projected on the bottom surface of the idler pulley 23. The engaging portion 105 consists of a step 106 and a slope 107.

As shown in FIG. 7, a projection 101 is formed on the periphery of the idler pulley 23. An auto-reset switch 102 and a lead-in switch 103 are attached to the second frame 2 so as to be actuated by the projection 101 of the idler pulley 23.

As shown in FIG. 14, a brake shoe 53 is arranged so as to be opposed to the periphery of the lead-in memory plate 39. The brake shoe 53 is fixed to a lead-in brake arm 51. One end of the arm 51 is supported at a pin 52 rotatably relative too the second frame 2, and a projection 168 formed on another end of the arm 51 is engaged with an operating pin 165. The pin 165 is fixed to one end of an operating lever 15 for the lead-in memory, and an intermediate portion of the lever 15 is supported at the pin 166 rotatably relative to the second frame 2. An operating knob 167 is fixed to another end of the lever 15. A brake shoe 56 is arranged so as to be opposed to the periphery of the lead-out memory plate 40. The brake shoe 56 is fixed to a lead-out brake arm 54. On end of the arm 54 is supported at a pin 55 rotatably relative to the second frame 2, and a cut-out portion 169 formed on another end of the arm 54 is engaged with an operating pin 170. The pin 170 is fixed to the intermediate portion of an operating lever 14 for the lead-out memory. One end of the lever 14 is supported at a pin 172 rotatably relative to the second frame 2, and an operating knob 171 is fixed to another end of the lever 14. One end of a coil spring 57 is fixed to the arm 54, and another end of the coil spring 57 is fixed to the arm 51, so that the arm 51 is urged anticlockwise around the pin 52, and the arm 54 is urged clockwise around the pin 55, in FIG. 14. The operating knobs 167 and 171 are inserted into arcuate guide holes 173 and 174, respectively.

As shown in FIG. 5, FIG. 6, FIG. 11 and FIG. 17, an oil damper 82 is attached to the second frame 2. An arm lifter 11 is fixed to the upper end of a supporting rod 12 movable in the vertical direction. A connecting tube 86 is connected to the lower end of the supporting rod 12 through a coil spring 85. The connecting tube 86 is connected to a plunger 87 of a plunger solenoid 83 attached to the ancillary frame 141. An arm lifter switch 84 is engaged with the lower end of the supporting rod 12 to detect the vertical movement of the arm lifter 11. The switch 84 is attached to the ancillary frame 141. A lifter guide rod 88 is arranged at the arm lifter 11. The rod 88 is guided movably in the first frame 1.

CIRCUIT

The circuit diagram applied to the embodiments of the invention, will be described with reference to FIG. 22.

A light detecting circuit comprises the light sensitive element 44, diodes 201 and 202, and variable resistors 233 and 234. The light detecting circuit works to detect whether the light sensitive element 44 receives the light from the lamp 43 over a given quantity or not. One terminal of the light sensitive element 44 is connected to a +5V D.C. voltage source 238 and another terminal of the light sensitive element 44 is connected to a connecting point 250 of the diode 201 and the variable resistor 233 which is connected between the cathode of the diode 201 and the anode of the diode 202. The variable resistor 234 is connected between a connecting point 251 of the anode of the diode 202 and the variable resistor 233, and a −5V DC voltage source 252. A connecting point 253 of the anode of the diode 201 and the cathode of the diode 202 is connected to an input terminal 236 of an operational amplifier 205.

An output terminal 261 of $\overline{\text{power A}}$ and an output terminal 276 of $\overline{\text{power B}}$ in a logic circuit 231 are connected to a base of a transistor 216 in common through resistors 213 and 212, respectively. An emitter of the transistor 216 is connected to a +5V D.C. voltage source 239 through a resistor 214, and a collector of the transistor 216 is connected to a base of a transistor 217. A connecting point 258 of the collector of the transistor 216 and the base of the transistor 217 is connected to an emitter of the transistor 217 through a resistor 215. The emitter of the transistor 217 is connected to the −5V D.C. voltage source 252 and a collector of the transistor 217 is connected to a collector of a PNP-transistor 207. The output terminal 261 of $\overline{\text{power A}}$ in the logic circuit 231 is connected also to a base of a PNP transistor 218 through a resistor 219. An emitter and a collector of the transistor 218 are connected to a +5V D.C. voltage source and to a collector of a transistor 206, respectively.

An output terminal 255 of power B in the logic circuit 231 is connected to another input terminal 235 of the operational amplifier 205 through diodes 203 and 204. A connecting point 259 of the diode 204 and the diode 203 is connected to a +5V D.C. voltage source 273 through a resistor 232. One end of a resistor 208 and that of a resistor 209 are connected to the input terminal 235 of the operational amplifier 205, and another end of the resistor 208 and that of the resistor 209 are connected to the +5V D.C. voltage source 262 and to the −5V D.C. voltage source 252, respectively.

An output terminal 240 of the operational amplifier 205 is connected to bases of the NPN transistor 206 and the PNP transistor 207, and it is connected also to a base of a transistor 224 through a diode 220 and a resistor 221. An electrolytic condenser 223 is connected between the base of the transistor 224 and the ground, and a bias resistor 222 is connected between the base of the transistor 224 and a −5V D.C. voltage source 265. An emitter of the transistor 224 is connected to the ground and a collector of the transistor 224 is connected to a time sense input terminal 279 of the logic circuit 231. The output terminal 240 of the operational amplifier 205 is connected moreover to an input terminal 278 of power A in the logic circuit 231. A connecting point 260 of an emitter of the NPN transistor 206 and an emitter of the PNP transistor 207 is connected to the electric motor 144.

An output terminal 270 for the lifter plunger and an output terminal 271 for the lead-in plunger in the logic circuit 231 are connected to bases of a transistor 229 and a transistor 230 through resistors 227 and 228, respectively. Emitters of the transistors 229 and 230 are connected to the ground, respectively, and collectors of the transistors 229 and 230 are connected to one end of the lifter plunger solenoid 83 and to that of the lead-in plunger solenoid 38, respectively. Another end of the solenoids 38 and 83 is connected to a +16V D.C. source 277. The output terminal 270 for the lifter plunger and the output terminal 271 for the lead-in plunger are connected to a +5V D.C. voltage source 272 through resistors 225 and 266, respectively.

A group of control switches are connected to the logic circuit 231. The group of control switches comprise a play switch 285, a cut switch 286, the all reset switch 102, the lead-in switch 103, an up switch 289, the arm lifter switch 84 and a slide switch 291. The slide switch 291 hs a manual terminal 292, an auto "1" terminal 293, an auto "2" terminal 294, an auto "3" terminal 295 and an auto "∞" terminal 296.

In the above-mentioned light detecting circuit, the potentials of the connecting points 250 and 251 change with the variation of the resistance of the light sensitive element 44 proportional to the light quantity incident on the light sensitive element 44. By the potentials of the connecting points 250 and 251 varying with the resistaance of the light sensitive element 44, either the diode 201 or the diode 202 is put into the ON-state, so that the light quantity incident on the light sensitive element 44 can be detected.

THe light detecting circuit can be put into the following states with the light quantity incident on the light sensitive element 44:

| | I | II | III |
|---|---|---|---|
| Diode 201 | ON | OFF | OFF |
| Diode 202 | OFF | OFF | ON |

In the state I, no light quantity or a little light quantity is incident on the light sensitive element 44, so that the potentials of the connecting points 250 and 251 is so low that the diode 201 is put into the ON-state and the diode 202 is put on the OFF-state.

Figure 21A:
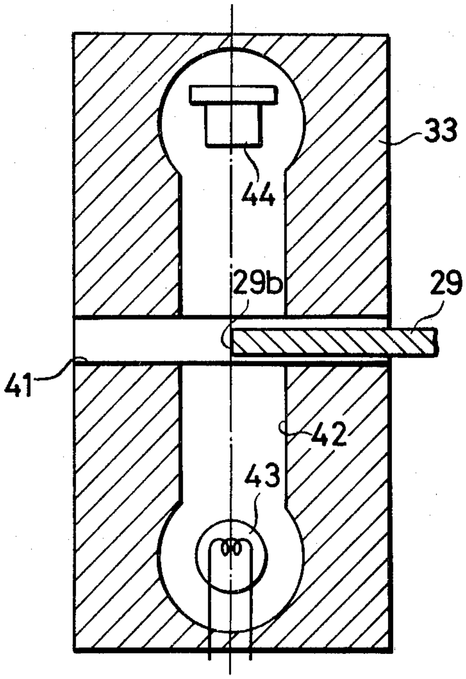
FIG. 21A is a front view of means for detecting a fixed point.
Figure 21B:
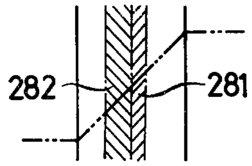
FIG. 21B is a diagram explaining the no-sensing zone of the means for detecting the fixed point.

In the state II, although some light quantity is incident on the light sensitive element 44, potentials are applied to the connecting points 250 and 251 so that both the diode 201 and the diode 202 are put in the OFF-state. The potentials of the connecting points 250 and 251 to some extent maintain both the diode 201 and the diode 202 in the OFF-state. This extent is a no-sensing zone 281 or 282 as shown in FIG. 21B and below-mentioned.

In the state III, more light quantity is incident on the light sensitive element 44, so that the potentials of the connecting points 250 and 251 are increased so high that the diode 201 is put in the OFF-state and the diode 202 is put into the ON-state.

The no-sensing zone of the state II can be adjusted by the variable resistors 233 and 234 in the width and the position of the center. In other words, when the width of the no-sensing zone 281 and 282 is changed, or when the position of the center of the no-sensing zone 281 and 282 is shifted left hand or right hand in FIG. 21B, the resistance of the variable resistor 233 or 234 is changed.

The voltage drop across the variable resistor 233 increses with the resistance of the variable resistor 233 to widen the no-sensing zone and the voltage drop across the variable resistor 233 decreases with the resistance of the variable resistor 233 decreases with the resistance of the variable resistor 233 to narrow the no-sensing zone.

On the other hand, the potentials of the connecting points 250 and 251 increase with the resistance of the variable resistor 234, so that the ON-OFF operation of the diodes 201 and 202 can be performed by less light quantity. In other words, the position of the cneter of the no-sensing zone is shifted left hand in FIG. 21B.

And the potentials of the connecting points 250 and 251 decreses with the resistance of the variable resistor 234, so that the ON-OFF operation of the diodes 201 and 202 can be performed by more light quantity. In other words, the position of the center of the no-sensing zone is shifted right hand in FIG. 21B. Consequently, the width and the position of the center, of the no-sensing zone can be arbitrarily adjusted within the range of the diameter of the long hole 42 shown in FIG. 21A.

OPERATION

The operation of the embodiments of the invention will be described with reference to FIGS. 5–25.

Figure 22:
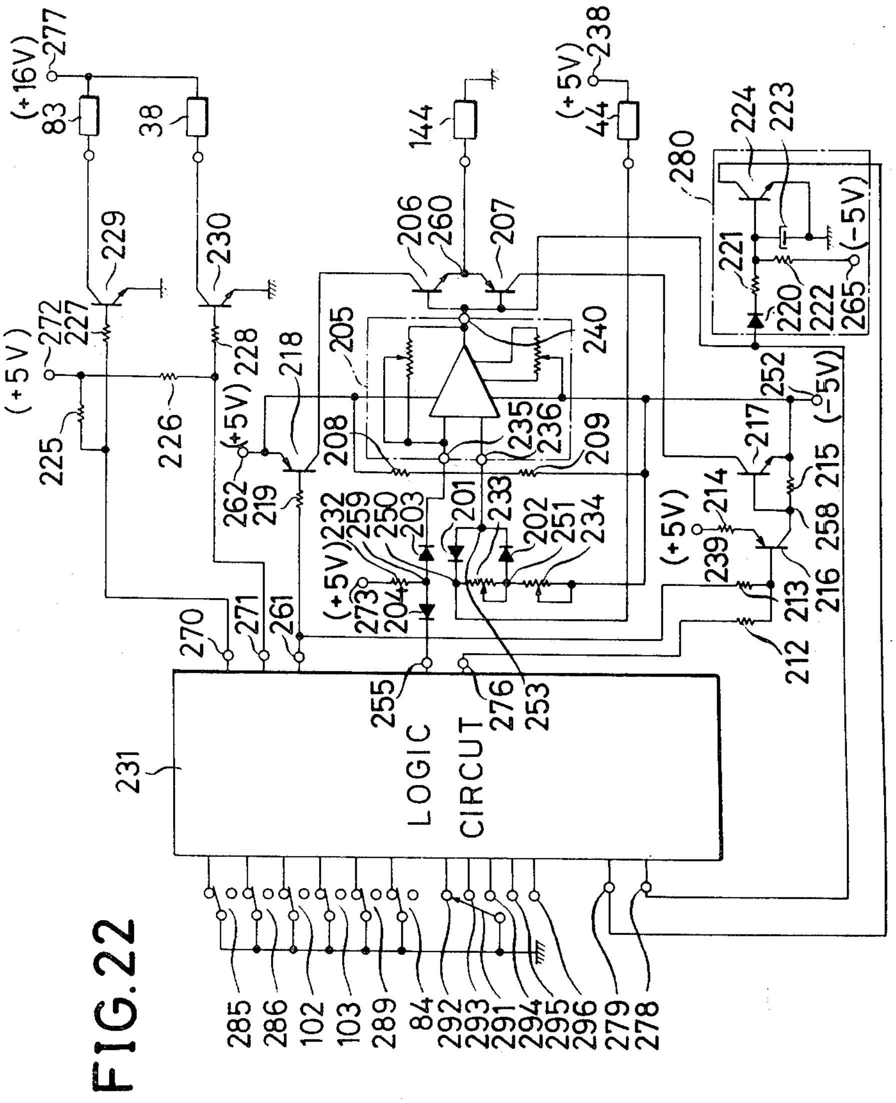
FIG. 22 is a circuit diagram applied to the pick-up arm assembly of the invention.

On the operation, electric power is applied to the circuit shown in FIG. 22 and to the lamp 43 by a power switch (not shown), so that the circuit is put into operation and the lamp 43 is lit.

Figure 23:
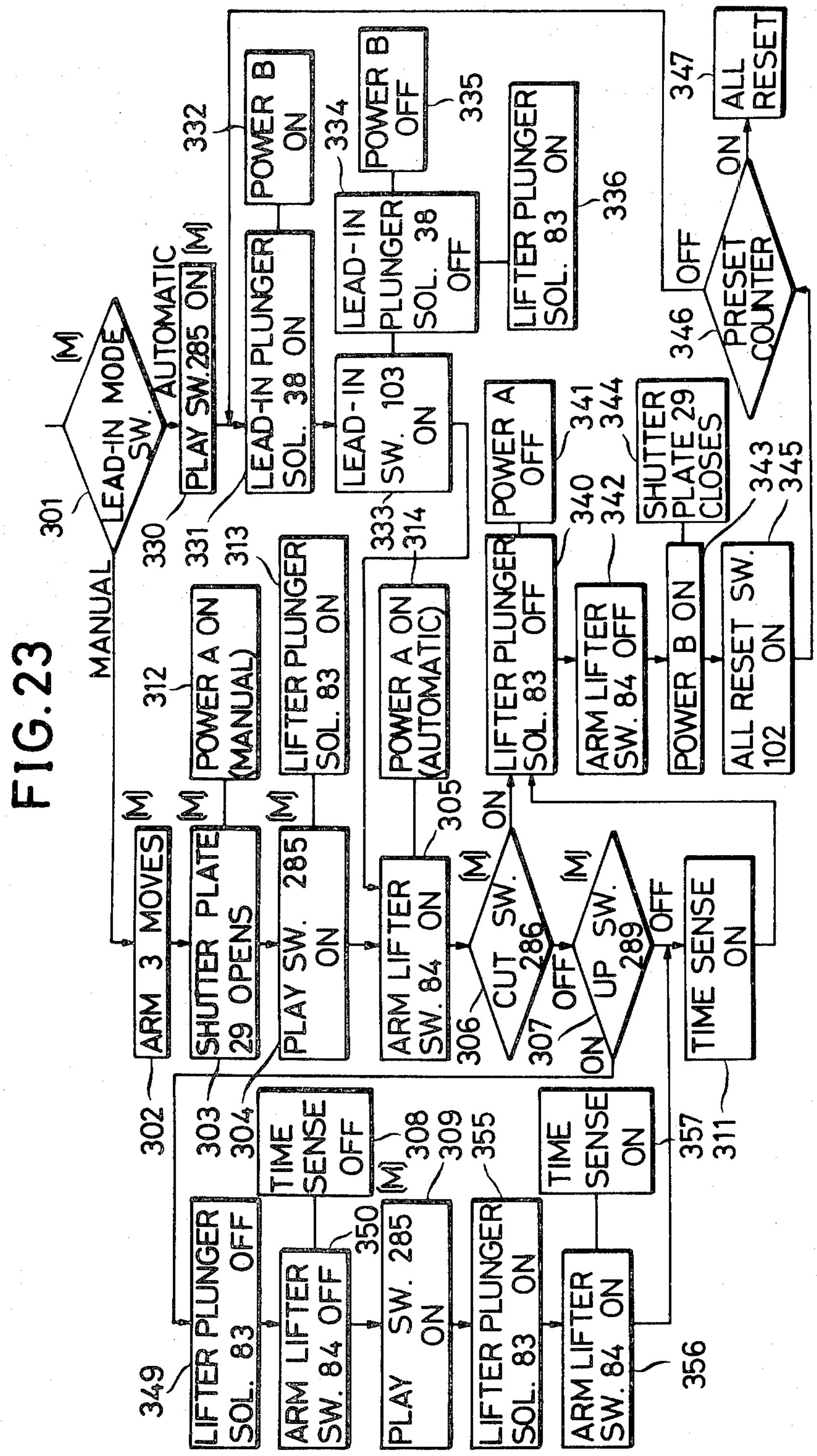
FIG. 23 is a flow chart explaining the operation of the pick-up arm assembly of the invention.

As shown in the flow-chart of FIG. 23, a manual operation or an automatic operation must be determined on the operation of the pick-up arm assembly. On the automatic operation, a lead-in mode switch is manually put into the ON-state as shown in a block 301 of FIG. 23, while on the manual operation, the lead-in mode switch is maintained in the OFF-state. In the flow chart of FIG. 23, [M] means the manual operation.

Figure 24:
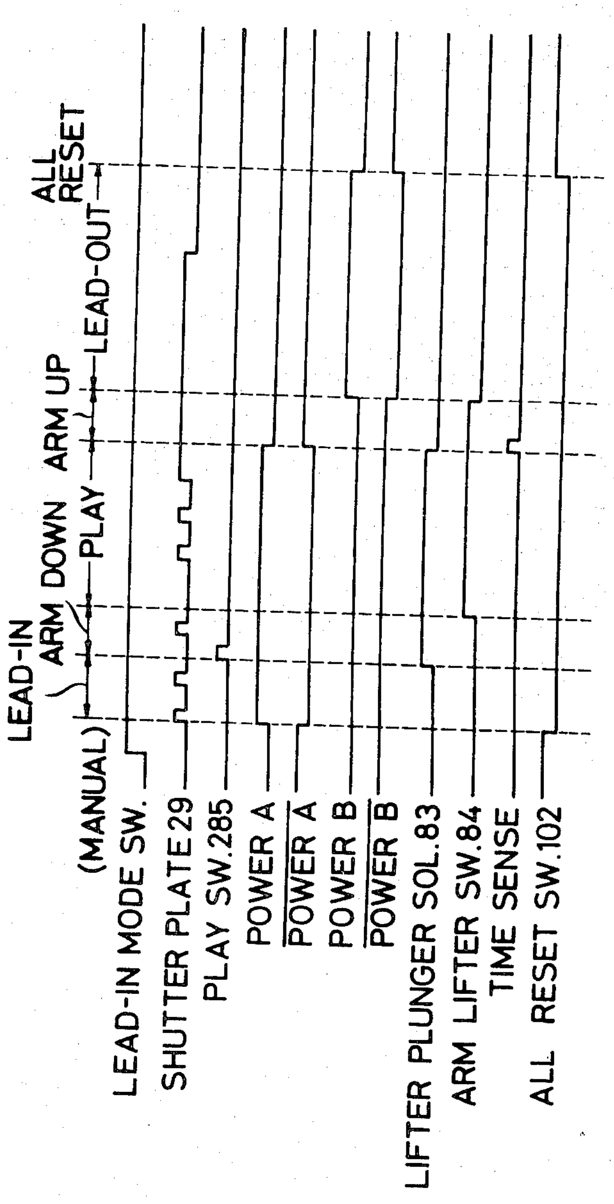
FIG. 24 is a timing diagram referenced to the manual operation of the circuit diagram shown in FIG. 22.

On the manual operation, the lead-in mode switch is set to the manual side as shown in the time chart of FIG. 24. In other words, the rotary switch 291 in FIG. 22 is connected to the manual terminal 292. Next, as shown in a block 302 of FIG. 23, the pick-up arm 3 is manually taken out from the arm holder 13 to be rotated clockwise around the arm supporting shaft 6 to the position of the beginning of the record-playing in FIG. 5, and the stylus S of the pick-up arm 3 is manually contacted with the most outside of the sound groove of the recorded disc 60.

The sector shutter plate 29 fixed to the arm supporting shaft 6 is likewise rotated with the above rotation of the pick-up arm 3, so that the top end portion 29*a* of the shutter plate 29 which has been closing the long hole 42 now exposes the long hole 42. In FIG. 21A and FIG. 21B, the relationship between the position of the shutter plate 29 relative to the long hole 42 and the no-sensing zones 281 and 282 of the light sensitive element 44 is shown. In the power A, when the edge 29*b* of the shutter plate 29 is moved more toward the right hand from the first no-sensing zone 281 in FIG. 21B, the electric motor 144 is rotated in the normal direction by a given circuit operation as below mentioned. And when the edge 29*b* of the shutter plate 29 is moved more toward the left hand from the first no-sensing zone 281 in FIG. 21B, the electric motor 144 is rotated in the reverse direction by a given circuit operation as below mentioned.

The first no-sensing zone 281 is reduced to the movement of about 0.1mm of the stylus S. Moreover, power A′ can be substituted for the power A. In the power A′, the second no-sensing zone 282 shown in FIG. 21B can be the same as the first no-sensing zone 281 in the power A. The second no-sensing zone 282 is reduced to the movement of about 0.2mm of the stylus S. To change the first no-sensing zone 281 into the second no-sensing zone 282, the resistances of the variable resistors 233 and 234 may automatically or manually be changed.

The reason why the no-sensing zone is required, is that the eccentricity of the center hole of the recorded disc 60, for instance, about 0.05mm causes the stylus S of the pick-up arm 3 to vibrate with the rotation of the recorded disc 60 at a certain stroke, for instance, about 0.1 mm. If the no-sensing zone is not suitably given, the direction of the electric motor 144 varies with the vibration.

When the edge 29*b* of the shutter plate 29 is moved right hand from the no-sensing zone 281 in FIG. 21B, or when the shutter plate 29 is opened in the long hole 42 over a given extent, as shown by a block 303 of FIG. 22, a light quantity from the lamp 43 over a given value is incident on the light sensitive element 44 such as CdS.

Figure 25:
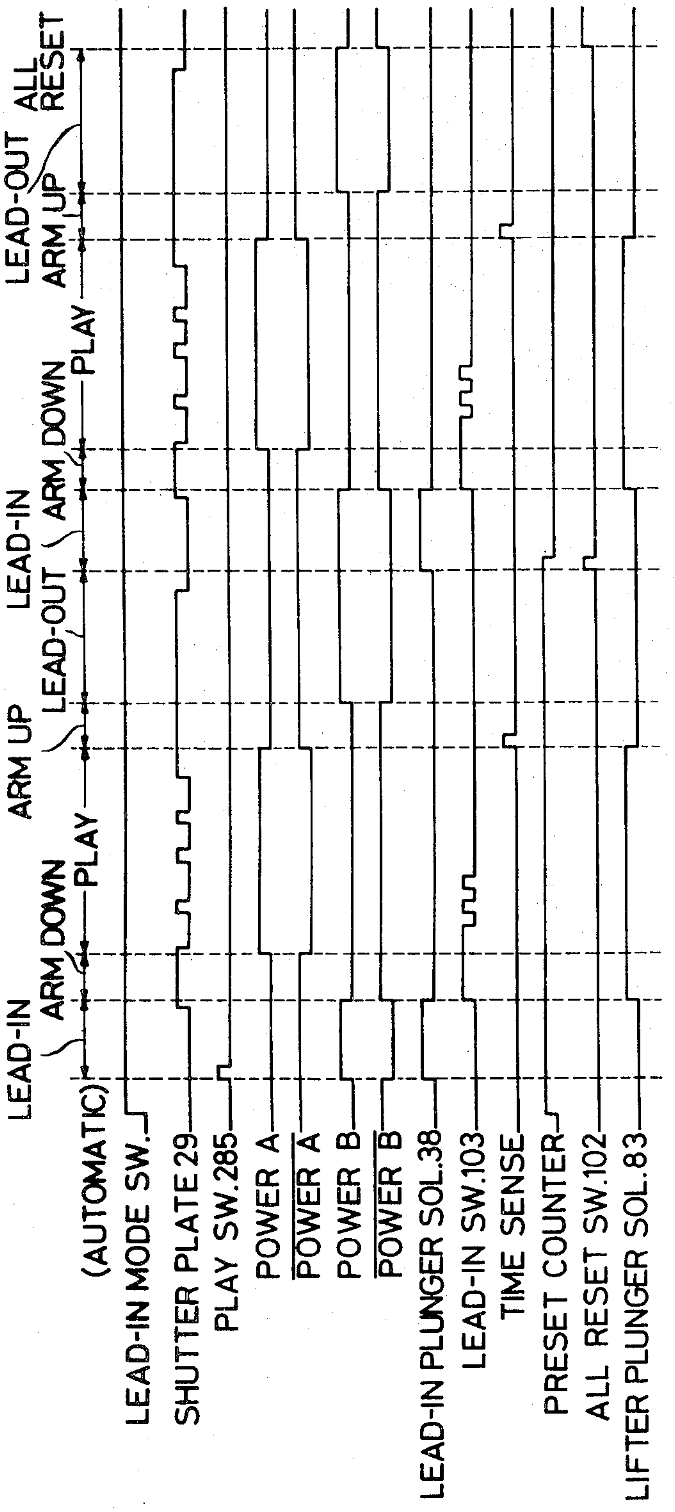
FIG. 25 is a timing diagram referenced to the automatic operation of the circuit diagram shown in FIG. 22.

In the initial condition where a light quantity from the lamp 43 under a given value is incident on the light sensitive element 44, for instance, in the condition where the pick-up arm 3 is maintained at the arm holder 13, the sector shutter plate 29 closes the long hole 42, so that no light quantity from the lamp 43 is incident on the light sensitive element 44. In the logic circuit 231 shown in FIG. 22, the output is 1 at the terminal 261 for the $\overline{\text{power A}}$, 0 at the terminal 255 for the power B, 1 at the terminal 276 for the $\overline{\text{power B}}$, 0 at the terminal 270 for the lifter plunger, and 0 at the terminal 271 for the lead-in plunger, as shown in FIG. 24 and FIG. 25.

The operation of the circuit in the above condition is as follows:

The resistance of the light sensitive element 44 varies with the light quantity incident on the light sensitive element 44. In other words, the more the light quantity, the lower the resistance of the light sensitive element 44, and the less the light quantity, the higher the resistance of the light sensitive element 44.

When no light quantity is incident on the light sensitive element 44 in the light detecting circuit comprising the light sensitive element 44, the variable resistors 233 and 234 and the diodes 201 and 202, the resistance of the light sensitive element 44 is increased, so that the potentials of the connecting points 250 and 251 are lowered relatively to the potential of the input terminal 236 of the operational amplifier 205. And the forward voltage is applied to the diode 201 to put the diode 201 into the ON-state, so that the potential of the input terminal 236 is lowered relatively to the standard potential OV of the input terminal 235. Therefore, the operational amplifier 205 is operating to maintain its output terminal 240 at a negative potential. When the output terminal 240 is maintained at the negative potential, the base of the NPN-transistor 206 is reversely biased and the base of the PNP-transistor 207 is fowardly biased.

The collector of the NPN-transistor 206 for an output stage is connected to the collector of the PNP-transistor 218 and the collector of the PNP-transistor 207 for the output stage is connected to the collector of the NPN-transistor 217. Therefore, although the forward voltage is applied to the base of the NPN-transistor 206 or the NPN-transistor 207 for the output stage, the NPN-transistor 206 or the PNP-transistor 207 for the output stage is not put into the ON-state, unless the PNP-transistor 218 or the NPN-transistor 217 is put into the ON-state.

In the logic circuit 231, the output is 1 at the terminal 261 for the $\overline{\text{power A}}$ and it is 1 at the terminal 276 for the $\overline{\text{power B}}$, so that the base of the PNP-transistor 218 is reversely biased to put the transistor 218 in the OFF-state. Since both the $\overline{\text{power A}}$ and the $\overline{\text{power B}}$ applied to the base of the PNP-transistor 216 are 1, the transistor 216 is put in the OFF-state. Therefore, no current flows into the base of the NPN-transistor 217, so that the transistor 217 is put in the OFF-state. Consequently, since both the NPN-transistor 206 and the PNP-transistor 207 for the output stage are put in the OFF-state, no current flows into the motor 144 and the motor 144 is not rotated.

On the other hand, the output voltage of the operational amplifier 205 is applied to the anode of the diode 220 and a -5V DC voltage from a terminal 265 is applied to the cathode of the diode 220 through the resistors 221 and 222, so that the diode 220 is reversely biased and is put in the OFF-state. Consequently, the -5V DC voltage is applied to the base of the transistor 224, and the transistor 224 is put in the OFF-state, so that the time sense circuit 280 is not operating.

Moreover, as the input terminal 278 of the logic circuit 231 is connected to the output terminal 240 of the operational amplifier 205, the negative voltage is applied to the input terminal 278 to hold the $\overline{\text{power A}}$ 1 at the terminal 261 and the power B 0 at the terminal 255.

As the outputs for the lift plunger and the lead-in plunger are 0 at the terminals 270 and 271 in the logic circuit 231, as shown in FIG. 24 and FIG. 25, both the transistor 229 and the transistor 230 are put in the OFF-state. Consequently, no current flows into the lift plunger solenoid 83 and the lead-in plunger solenoid 38, and so the lift plunger 87 and the lead-in plunger 157 do not operate.

As above mentioned, when the pick-up arm 3 is moved to the position of the beginning of the record playing, the sector shutter plate 29 is opened and the light from the lamp 43 is incident on the light sensitive element 44. The resistance of the light sensitive element 44 is decreased in proportion to the light quantity incident on the light sensitive element 44, so that the potentials of the connecting points 250 and 251 is increased. As shown by a block 303 of FIG. 23, when the shutter plate 29 is opened over the given extent and so the light is incident on the light sensitive element 44 over the given quality, the potentials of the connecting points 250 and 251 rise up over a given level and become higher relatively to the potential of the input terminal 236 of the operational amplifier 205, so that the diode 202 is put into the ON-state and the potential of the input terminal 236 becomes higher relatively to the standard potential of the input terminal 235. Consequently, the operational amplifier 205 operates to put the output terminal 240 into the positive potential. By the positive output of the operational amplifier 205, the base of the transistor 206 is forwardly biased and the base of the transistor 207 is reversely biased.

Moreover, the positive output of the operational amplifier 205 is applied to the input terminal 278 of the logic circuit 231, so that the output of the $\overline{\text{power A}}$ is put into 0 by the operation of the logic circuit 231.

In other words, the output of the $\overline{\text{power A}}$ is put into 0 by the opening of the shutter plate 29, as shown in FIG. 24, that is to say, the output of the $\overline{\text{power A}}$ is put into the ON-state, as shown in a block 312 of FIG. 23. At that time, the outputs of the power B and the $\overline{\text{power B}}$ are maintained 0 and 1, respectively. The base of the transistor 218 is forwardly biased because power is 0. Since the $\overline{\text{power A}}$ of 0 and the $\overline{\text{power B}}$ is 1 are applied to the base of the transistor 216, the base of the transistor 216 is forwardly biased to put the transistor 216 into the ON-state, and the base of the transistor 217 is forwardly biased to put the transistor 217 into the ON-state. Consequently, the transistor 206 for the output stage is put into the ON-state and the transistor 207 for the output stage is put into the OFF-state. A current flows into the motor 144 from the connecting point 260 to rotate the motor 144 in the normal direction.

On the manual operation of the pick-up arm assembly, after the pick-up arm is manually moved to open the sector shutter plate 29, the play switch 285 is turned on, as shown in a block 304 of FIG. 23, whereby the turning table or the recorded disc 60 begins to rotate, and the output of 1 occurs at the output terminal 270 for the lifter plunger to put the transistor 229 into the ON-state Therefore, the lifter plunger solenoid 83 is turned on, as shown in a block 313 of FIG. 23 and a current flows into the solenoid 83.

Consequently, the plunger 87 of the lifter plunger solenoid 83 as shown in FIG. 17 is moved downwards to move the arm lifter 11 or the pick-up arm downwards. The stylus S of the pick-up arm 3 contacts with the sound groove of the turning recorded disc 60 to begin the recordplaying. Moreover, by the downward movement of the plunger 87, the arm lifter switch 84 is turned on, as shown in a block 305 of FIG. 23.

As above-mentioned, by the opening of the shutter plate 29, the state of the power A can be obtained either before the beginning of the record-playing, or after the beginning of the record-playing. On the manual operation, the state of the power A is obtained before the beginning of the record-playing. In other words, while the pickup arm 3 is taken out from the arm holder 13 and is rotated clockwise around the center of the axis of the arm supporting shaft 6 to the position of the beginning of the record-playing in FIG. 5, the shutter plate 29 is opened over the given extent and state of the power A can be obtained. At the position of the beginning of the record-playing the points X, P and S are so controlled as to lie on the straight line in the state of the power A, so that the tracking error is corrected at the beginning of the record-playing and during the record-playing.

As the pick-up arm 3 is rotated gradually clockwise around the supporting shaft 6 as the fulcrum with the progress of the record-playing in FIG. 5, the shutter plate 29 is opened over the given extent to rotate the motor 144 in the normal direction. The rotation of the shaft 145 of the motor 144 is transmitted to the columnar rotary member 7 through the idler 137, the rotary shaft 138, the intermediate pulley 136, the belt 135, the idler pulley 23, the friction plate 131 and the felt mounting plate 130 with much reduction. consequently, the rotary member 7 is rotated clockwise around the fixed point C at an extremely low rate in FIG. 5. With this rotation, the arm supporting shaft 6 is rotated clockwise around the fixed point C in FIG. 5 and the shutter plate 29 fixed to the shaft 6 is moved so as to close the long hole 42. With this movement, the edge 29b of the shutter plate 29 comes into the no-sensing zone 281 from right-hand, in FIG. 21B. In such a manner, a steady state can be obtained in which about half of the long hole 42 is closed by the shutter plate 29. In the steady state, the potentials of the connecting points 250 and 251 are so high as to maintain both the diode 201 and the diode 202 at the OFF-state, so that the potential of the input terminal 236 is the same as the standard potential OV of the input terminal 235 and the output voltage of the operational amplifier 205 is OV. The potential of the bases of the transistors 206 and 207 is the same as that of the emitters of the transistors 206 and 207, and the transistors 206 and 207 are put into the OFF-state. Consequently, no current flows into the motor 144, and so the motor 144 is not rotated.

In the above condition, or in the condition that the edge 29b of the sector shutter plate 29 is positioned in the no-sensing zone and the motor 144 is stopped, the pick-up arm 3 moves toward the inside of the recorded disc 60 with the progress of the record-playing. With this movement of the pick-up arm 3, the sector shutter plate 29 is moved gradually so as to open the long hole 42, so that the light quantity incident on the light sensitive element 44 is increased to rise the potentials of the connecting points 250 and 251. When the edge 29*b* of the shutter plate 29 is moved right-hand from the no-sensing zone, the diode 202 is put into the ON-state and the potential of the input terminal 236 rises up. With the rising, the output voltage of the operational amplifier 205 rises up to put the transistor 206 for the output stage into the ON-state. Consequently, a current flows into the motor 144 from the connecting point 260 again to rotate the motor 144 in the normal direction.

In such a manner, the motor 144 is repeatedly rotated in the normal direction and the edge 29b of the shutter plate 29 comes repeatedly into the no-sensing zone, so that the points X, P and S are so controlled as to lie on the straight line and the tracking error is intermittently corrected. Moreover, when the edge 29*a* of the shutter plate 29 is moved left-hand beyond the no-sensing zone in FIG. 21B for some reason at the state of the power A, and the light quantity incident on the light sensitive element 44 is decreased under the given value, the resistance of the light sensitive element 44 is increased over the given value and the potentials of the connecting points 250 and 251 are decreased under the given levels to put the diode 201 into the ON-state and to put the diode 202 into the OFF-state. And as the potential of the input terminal 236 is lowered relative to the standard potential of the input terminal 235, the output voltage of the operational amplifier 205 becomes negative. By the negative output voltage of the operational amplifier 205 becomes negative. By the negative output voltage of the operational amplifier 205, the base of the transistor 206 is reversely biased and the base of the transistor 207 is forwardly biased. Since the power A and the power B are 0 and 1 respectively, the transistors 218 and 217 are put in the ON-state, as before. Consquently, the transitor 207 for the output stage is put into the ON-state and a current flows from the motor 144 to the connecting point 260 to rotate the motor 144 in the reverse direction. By the reverse rotation of the motor 144, the arm-supporting shaft 6 is rotated anticlockwise around the fixed point C in FIG. 5 and the sector shutter plate 29 is moved so as to open the long hole 42. And the edge 29b of the shutter plate 29 comes again into the no-sensing zone 281 to stop the motor 144.

During the record-playing, the sector shutter plate 29 is driven gradually to open the long hole 42 with the movement of the pick-up arm 3 toward the inside of the recorded disc 60, by the inside force. On the other hand, the position of the shutter plate 29 is detected by the light sensitive element 44, and the abovementioned control circuit drives the motor 144 to move the sector shutter plate 29 in the closing direction. Consequently, during the record-playing, the shutter plate 29 is not perferctly closed or opened over a limited time, but is maintained halfopened.

On the end of the record-playing, as well known, the pickup arm 3 is moved rapidly toward the center of the recorded disc. As the servo-system to control the movement of the shutter plate 29 cannot respond to the rapid motion of the shutter plate 29 following the above rapid motion of the pick-up arm 3, the shutter plate 29 is opened for a relatively long time, for instance, over three seconds.

The time sense circuit 280 works to detect that the shutter plate 29 is opened for a relatively long time on the end of the record-playing.

The cathode of the diode 220 in the time sense circuit 280 is connected to the L-5V D.C. voltage source 265 through the resistors 221 and 222. When the shutter plate 29 is opened the output voltage of the operational amplifier 205 becomes positive, the diode 220 is put into the ON-state. As the charging time constant of the condenser 223 is set to about three seconds, the time sense circuit 280 does not operate when the shutter plate 29 is opened for a relatively short time under about three seconds. In other words, during the record-playing on the manual operation, the time sense circuit 280 does not operate. Since the diode 220 is put in the ON-state for a relatively long time over three seconds at the end of the reproduction, the potential of the base of the transistor 224 is increased beyond the charging time constant of the condenser 223 to put the transistor 224 into the ON-state.

In the ON-state of the transistor 224, a time sense signal is generated at the time sense circuit 280 and it is applied to the input terminal 279 of the logic circuit 231 to operate the logic circuit 231 and to put the output of the power A into the state 1 and the output for the lifter plunger solenoid into the state 0. In other words, when the shutter plate 29 is opened for a relatively long time over about three seconds and so the signal for the end of the record-playing is applied to the logic circuit 241, the logic circuit 231 generates the order signal for the end of the record-playing.

When the output of the power A is put into the state 1 to put the power A into the OFF-state as shown in a block 341 of FIG. 23, the transistors 218 and 216 are put into the OFF-state, so that no current flow into the motor 144 and the motor 144 is stopped. And when the output for the lifter plunger solenoid is put into the state 0 as above mentioned, to put the transistor 229 into the OFF-state, no-current flows into the lifter plunger solenoid 83 as shown in a block 340 of FIG. 23 and the solenoid 83 is put into the OFF-state. Therefore, the plunger 87 is risen up by a spring (not shown) to the position shown in FIG. 17. With the rising, the pick-up arm 3 is lifted up to separate the stylus S from the recorded disc 60.

By the rising-up of the plunger 87, the arm lifter switch 84 is turned off, as shown in a block 342 of FIG. 23, and so the outputs of the power B and the power B are put into the states 1 and 0, respectively. When the output of the power B is put in the state 1, that is to say, when the power B is put in the ON-state as shown in a block 343 of FIG. 23, the diode 204 is put into the OFF-state to rise the potential of the anode of the diode 203 and thereby to put the diode 203 into the ON-state. Consequently, since the standard potential of the operational amplifier 205 rises up at the input terminal 235, the output of the operational amplifiier 205 is maintained at the negative potential to put the transistor 207 for the output stage in the ON-state. And when the output of the power B is put in the state 0, the transistor 216 and therefore the transistor 217 are put into the ON-state. When both the transistor 207 and the transistor 217 are put in the ON-state, a current flows to the connecting point 260 from the motor 144 to rotate the motor 144 in the reverse direction.

By the reverse rotation of the motor 144, the columnar rotary member 7 is rotated anti-clockwise in FIG. 5 to rotate the arm supporting shaft 6 anti-clockwise around the fixed point C in FIG. 5. Consequently, the shutter plate 29 is rotated to the original position and the closing condition of the shutter plate 29 is obtained, as shown in a block 344 of FIG. 23. Moreover, in that condition, since the state of the power A is released and the state of the power B is maintained, the motor 144 continues to rotate in the reverse direction independently of the position of the shutter plate 29.

Consequently, the arm supporting shaft 6 is restored to the initial condition as shown in FIG. 5 and moreover the idler pulley 23 is rotated clockwise to the initial condition after about one revolution, as shown in FIG. 7, to turn on the all reset switch 102 by its projection 101 as shown in a block 345 of FIG. 23. With the rotation of the idler pulley 23, the slope 107 of the engaging portion 105 is engaged with the engaging pin 47 to rotate the pin 47 and therefore the first lead-in arm 30 clockwise in FIG. 9. By this rotation, the pick-up arm 3 is rotated clockwise in FIG. 9 or anti-clockwise in FIG. 5 through the coil spring 93 to be held by the arm holder 13. Therefore, the pressure applied to the engaging pin 47 by the slope 107 is remarkably increased, so that the engaging pin 47 is moved downward against the coil spring 48 and the engaging portion 105 goes beyond the engaging pin 47. And the idler pulley 23 is restored to the initial condition as above mentioned.

As above mentioned, when the all reset switch 102 is turned on, the all reset operation is performed as shown in a block 347 of FIG. 23, unless the preset operation is previously performed by a preset counter (not shown), that is to say, if the counting number of the preset counter is zero and the counter is put in the ON-state.

The all reset operation may be designed not to be performed by the fact that the all reset switch 102 is turned on once. In such a case, the all reset operation can be performed after the motor 144 continues to rotate moreover and the idler pulley 23 has been rotated clockwise once more revolution in FIG. 7.

When the cut switch 286 is manually turned on during the record-playing, as shown in a block 306 of FIG. 23, the lifter plunger solenoid 83 and the power A are put into the OFF-state, as in the case that the signal from the time sense circuit 280 puts the lifter plunger solenoid 83 and the power A into the OFF-state, so that the record-playing is finished on the way, as in the operation by the time sense circuit 280.

When the record-playig is to be interrupted for a time the up switch 289 is turned on, as shown in a block 307 of FIG. 23. The output for the lifter plunger is put in the state 0, in the logic circuit 231, and so the lifter plunger solenoid 83 is put into the OFF-state, as shown in a block 349 of FIG. 23, whereby the pick-up arm 3 is lifted up. Moreover, by the turn-off of the solenoid 83, the arm lifter switch 84 is put into the OFF-state, as shown in the block 350 of FIG. 23. Although the signal from the time sense circuit 280 is applied to the logic circuit 231, the state of the power B is not obtained. It is the state in which the time sense is put in the OFF-state, as shown in a block 308 of FIG. 23.

When the play switch 285 is turned on after the lapse of the desired interruption time, as shown in a block 309 of FIG. 23, the lifter plunger solenoid 83, the arm lifter switch 84 and the time sense are put into the ON-state, as shown in blocks 355, 356 and 357, respectively. Consequently, the same state as before the up switch 289 was put into the ON-state, is obtained, and the record-playing is performed.

Moreover, when the pick-up arm 3 is brought to the arm holder 13 during the record-playing, the shutter plate 29 continues to close the long hole 42 in the state of the power A, so that the motor 144 continues to rotate in the reverse direction and the all reset switch 102 is put into the ON-state as in the state of the power B, to obtain the initial condition. This operation is performed likewise also in the case that the record-playing is ceased by the turn-on of the up switch 289.

Next, when the pick-up arm assembly is automatically used, the lead-in mode switch is manually set to the auto-side, as shown in the block 301 of FIG. 23. In other words, the rotary switch 291 shown in FIG. 22, is connected to any one of the auto 1 terminal 293, the auto 2 terminal 294, the auto 3 terminal 295 and the auto ∞ terminal 296. By the connection of the switch 291 to the auto 1 terminal, the auto 2 terminal, the auto 3 terminal and the auto ∞ terminal, the preset counter is set to one, two, three and continuous performances of the reproduction repsectively. The preset counter is switched over to the OFF-state from the ON-state, and it is put into the ON-state when the desired numbers of times of the performances have been finished.

Next, the play switch 285 is turned on to rotate the turning table and therefore the recorded disc 60 and to put the output for the lead-in plunger and the output of the power B into the state 1.

When the output for the lead-in plunger is put into the state 1, the transistor 230 is put into the ON-state and a current flows into the lead-in plunger solenoid 38. The solenoid 38 is put in the ON-state, as shown in a block 331 of FIG. 23. Therefore, the plunger 157 of the lead-in plunger solenoid 38 is moved to the position of beginning of the lead-in operation shown in FIG. 8, from the normal position shown in FIG. 7, against the springs 158 and 99. Consequently, the operating arm 36 is rotated anti-clockwise around the supporting pin 37 in FIG. 7, and so the operating arm 35 connected to the operating arm 36 is moved to the left in FIG. 7, to the position shown in FIG. 8 or the position shown by the two dots-dash lines of FIG. 18. Since the flange 153 of the pin 34 contacts with the upper side of the taper portion 91a of the operating arm 35, the pin 34 is lifted by the spring 152, so that the pin 4 works to stop the first lead-in arm 30, as shown by the dots-dash line of FIG. 18.

When the output of the power B is put into the state 1, as shown in a block 332 of FIG. 23, the motor 144 rotates in the reverse direction, as above-mentioned. By the reverse rotation of the motor 144, the idler pulley 23 is rotated clockwise in FIG. 8. When the arm supporting shaft 6 is restored to the initial position shown in FIG. 5, the rotation of the motor 144 is not transmitted to the rotary member 7, but only the idler pulley 23 runs idle. The pulley 23 is rotated clockwise in FIG. 8 at the low rate and the tracing member 97 of the second lead-in arm 95 begins to contact with the cam portion 160 of the pulley 23 and then traces the cam portion 16 to be moved toward the center of the pulley 23. Therefore, the second lead-in arm 95 is rotated anti-clockwise around the supporting pin 37 in FIG. 8. With the rotation, the second lead-in arm 95 is engaged with the first lead-in arm 30 at its engaging member 96 to move the first lead-in arm 30 to the position shown in FIG. 9. And then the first lead-in arm 30 contacts with the stopper pin 34 to stop.

The anti-clockwise rotation of the first lead-in arm 30 is transmitted directly to the arm supporting shaft 6 by the bolt 89 and the spring 93. Consequently, the arm supporting shaft 6, the pickup arm 3 and the shutter plate 29 are rotated anticlockwise in FIG. 8. This rotation stops when the edge 29*b* of the shutter plate 29 is nearly positioned at the long hole 42 of the fixed-point detecting means 32, that is to say, when the pick-up arm 3 is brought to the position of the beginning of the record playing.

When the above-mentioned rotation of the idler pulley 23 is almost finished, the projection 101 of the idler pulley 23 puts the lead-in switch 103 into the ON-state, as shown in a block 333 of FIG. 23. By the turn-on of the switch 103, the output for the lead-in plunger and the output of the power B are put into the state 0 from the state 1, and the output of the power B and the output for the lifter plunger are put into the state 1 from the state 0.

When the output for the lead-in plunger is put in the state 0, the transistor 230 is put into the OFF-state and no current flows into the lead-in plunger solenoid 38.

Figure 19:
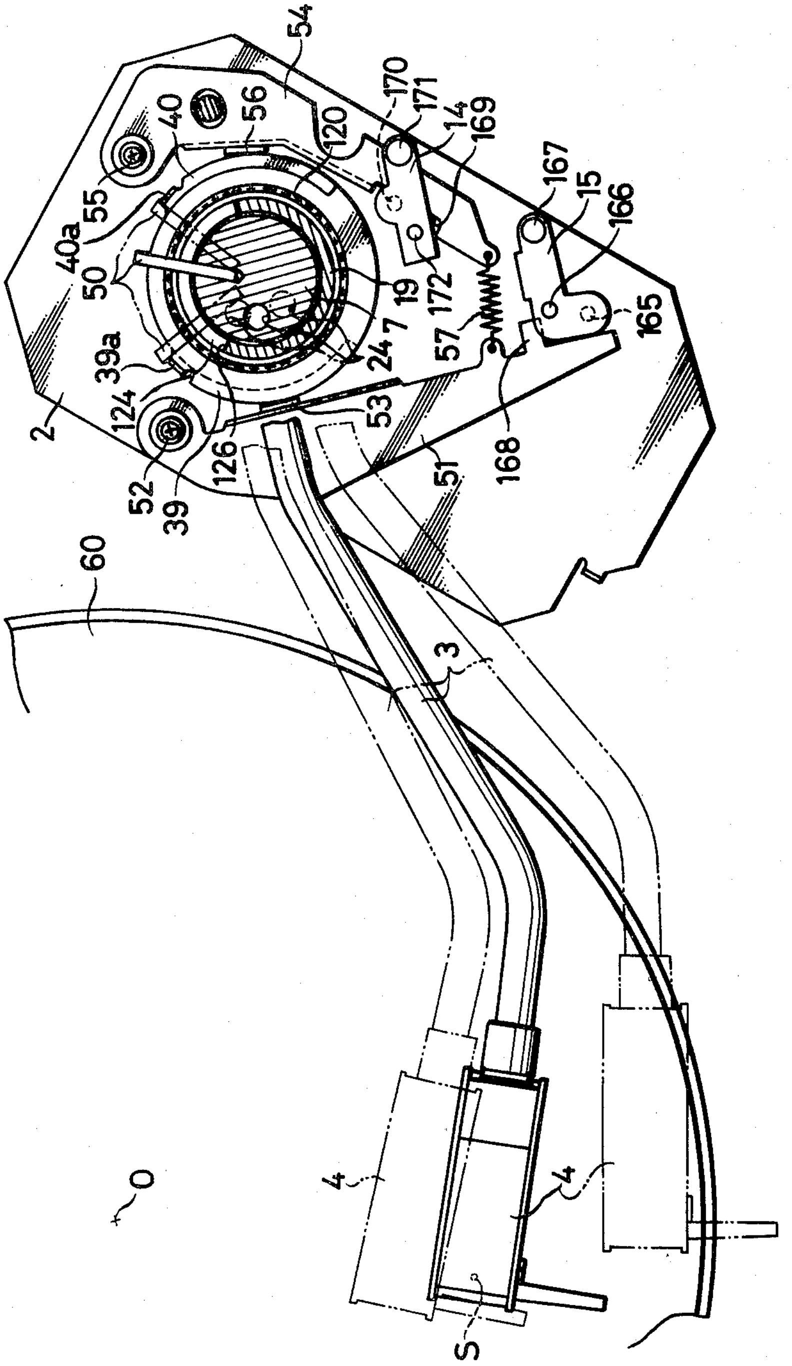
FIG. 19 is a cross-sectional view of the pick-up arm assembly except a size-preset ring, taken along the lines XIX—XIX of FIG. 12.

The lead-in plunger solenoid 38 is put in the OFF-state, as shown in a block 334 of FIG. 23. Consequently, the lead-in plunger 157 is restored to the original position by the spring 158 and 99. With this restoration, the operating arms 35 and 36, and the second lead-in arm 95 are restored as shown in FIG. 10. With the restoration of the operating arm 35, the stopper pin 34 at the upper position shown by the two dots-dash lines of FIG. 12 and FIG. 19 is moved down-ward, as shown by the solid line of FIG. 12 and FIG. 18. Consequently, the first lead-in arm 30 can be rotated anti-clockwise in FIG. 10, as on the manual operation.

When the output of the power B is put into the state 0 and that of the $\overline{\text{power B}}$ is put into the state 1, the power B is put into the OFF-state, as shown in a block 335 of FIG. 23.

Moreover, when the output for the lifter plunger is put into the state 1 as above mentioned, the lifter plunger solenoid 83 is put into the ON-state as shown in a block 336 of FIG. 23, so that the stylus S of the pick-up arm 3 contacts with the sound groove of the recorded disc 60 and the arm lifter switch 84 is turned on, as shown in the block 305 of FIG. 23. By the turn-on of the arm lifter switch 84, the output of the $\overline{\text{power A}}$ is put into the state 0 from the state 1 and the state of the power A is obtained, as shown in a block 314 of FIG. 23 and as on the manual operation. Hereafter, the same operations as the manual operation are performed.

When the all reset switch 102 is put into the ON-state, as shown in the block 345 of FIG. 23, the preset counter is put in the OFF-state unless the preset numbers of times of the performances are finished, so that the operations are performed in the same manner as in the case that the play switch 285 is put into the ON-state, as shown in the block 330 of FIG. 23. In other words, the lead-in plunger 38 and the power B are put into the ON-state, as shown in the blocks 331 and 332. And when the preset numbers of times of the performances are finished and the preset counter is put into the ON-state, the all reset operation is performed as on the manual operation and as shown in the block 347 of FIG. 23.

In the above embodiments, the size preset ring 45 is set to the dial scale corresponding to the size of the recorded disc to be reproduced, on the automatic operation. The oblong hole 125 formed on the size preset ring 45 is rotated clockwise in FIG. 14 when the size of the recorded disc to be reproduced is smaller. When the motor 144 is rotated in the reverse direction to restore the rotary member 7 anti-clockwise in FIG. 14, at the beginning of the record-playing or on the end of the previous record-playing, the stopper pin 50 contacts with the stopping portion 126 of the oblong hole 125 to stop the rotation of the rotary member 7. When the size preset ring 45 is rotated clockwise in the condition shown by FIG. 14, the stopper pin 50 is rotated with the stopping portion 126 to rotate the rotary member 7 and therefore the arm supporting shaft 6.

For the lead-in operation of the pick-up arm 3 on the automatic operation, the motor 144 is rotated in the reverse direction in the ON-state of the power B as shown in the block 332 of FIG. 23, and the rotary member 7 and the stopper pin 50 are rotated anticlockwise in FIG. 14 when the stopper pin 50 does not contact with the stopping portion 126. Consequently, the stopper pin 50 comes into contact with the stopping portion 126. The stopper pin 50, therefore the rotary member 7 and the arm supporting shaft 6 are previously arranged at the positions corresponding to the size of the recorded disc, for the lead-in operation of the pick-up arm 3 on the automatic operation. In the lead-in of the pick-up arm 3, the points X, P and S are arranged so as to lie nearly on the straight line, in FIG. 5. Because the first lead-in arm 30 is in the position to contact with the stopper pin 34 and so the edge **29*b* of the shutter plate 29 is positioned in the long hole 41 of the fixedpoint detecting means 32. When the points X, P and S are arranged so as to lie on the straight line on the lead-in of the pick-up arm 3, the stylus S of the pickup arm 3 is put at the most outside of the sound groove of the recorded disc, that is to say, at the position of the beginning of the record-playing. Consequently, if the size preset ring 45** is preset in accordance with the size of the recorded disc, the stylus S is automatically brought to the position of the beginning of the record-playing.

In the above embodiments, the lead-in memory operation and the lead-out memory operation can be performed in which the lead-in position and/or the lead-out position, of the stylus S can be arbitrarily selected in the recorded disc 60 and only the desired surface of the recorded disc 60 can be reproduced.

When the lead-in memory operation is preformed, the operating lever 15 for the lead-in memory is rotated anti-clockwise around the pin 166 by the operating knob 167 in FIG. 14 when the stylus S has come to the position where lead-in memory is desired. By the rotation, the lever 15 is moved to the position shown by the two-dots dash lines of FIG. 14 from the position shown by the solid line of FIG. 14, so that the brake arm 51 for the lead-in is rotated anti-clockwise around the pin 52 through the operating pin 165 in FIG. 14 to stop the rotation of the lead-in memory plate 39 by the brake shoe 53. When the memory operation is not performed, the lead-in memory plate 39 as well as the lead-out memory plate 40 is rotated with the stopper pin 50, nipping the pin 50 elastically between the respective projections **39*a* and 40*a*. On the other hand, when the rotation of the memory plate 39 is stopped by the brake shoe 53, the memory plate 39 is held there until it is released from the brake shoe 53. Consequently, with the progress of the record-playing, the stopper pin 50 is rotated clockwise in FIG. 14 gradually to increase the distance between the pin 50 and the projection 39*a* of the lead-in memory plate 39.**

When the lead-out memory operation is performed, the operating lever 14 for the lead-out memory is rotated anti-clockwise around the pin 172 by the operating knob 171 in FIG. 14 when the stylus S has come to the position where the lead-out memory is desired. By the rotation, the lever 14 is moved to the position shown by the two-dots dash lines of FIG. 14 from the position shown by the solid line of FIG. 14, so that the brake arm 54 for the lead-out is rotated clockwise around the pin 55 through the operating pin 170 in FIG. 14 to stop the rotation of the lead-out memory plate 40 by the brake shoe 56. Consequently, the lead-out memory plate 40 is held there until it is released from the brake shoe 56.

Therefore, the stopper pin 50, the rotary member 7 and the arm supporting shaft 6 cannot be moreover rotated clockwise in FIG. 14, but only the pick-up arm 3 is gradually rotated clockwise around the arm supporting shaft 6 by the inside force occuring in the record-playing. Although the motor 144 is rotated in the normal direction, the arm supporting shaft 6 can no more be rotated clockwise around the fixed point C in FIG. 5, but only the pick-up arm 3 continues to rotate as above mentioned. Therefore, the shutter plate 29 cannot close the long hole 42 and so the opening of the shutter plate 29 is maintained for a relatively long time over three seconds. Consequently, the time sense is put into the ON-state, as shown in the block 311 of FIG. 23 and the operations as shown in the blocks 340–345 of FIG. 23 are performed for the end of the record-playing.

When the automatic operation is performed in the above conditions, the projection 39a of the lead-in memory plate 39 determins the initial position of the stopper pin 50 instead of the oblong hole 125 of the size preset ring 45. Therefore, the record-playing cana begin at the position of the surface of the recorded disc 60, corresponding to the position of the projection 39*a*. Moreover, the lead-out of the pick-up arm 3 can be performed at the position of the surface of the recorded disc 60, corresponding to the position of the projection 40*a*. And in the record playing, the pick-up arm 3 repeats the above-mentioned operations until the fixing of the memory plates 39 and 40 is released.

As above described, the invention provides the pick-up arm assembly in which no tracking error occurs, and can attain the foregoing objects by the assembly with additional means.

While preferred embodiments have been described, variations thereto will occur to those skilled in the art within the scope of the present inventive concepts which are delineated by the following claims.

What is claimed is:

1. A pick-up arm assembly comprising: a pick-up arm; a pivotable arm support member for pivotally supporting said pick-up arm at a single pivot point P; means for rotating said pivot point P about an axis C; a stylus holding member mounted on said pick-up arm for holding a stylus S, the stylus holding member having a longitudinal axis which defines a constant angle $\theta$ with a line PS defined by said pivot point P and said stylus S; detecting means for detecting if an extension of said line PS intersects a predetermined point X; motor means responsive to said detecting means for producing a motive force when said extension of said line PS does not intersect said predetermined point X; transmission means for transmitting said motive force to said pivot point rotating means for rotating said pivot point about said axis C in the direction to return said extension of said line PS to intersect said predetermined point X; a first lead-in arm mechanically coupled to said arm support member and rotatable to pivot said arm support member to a predetermined rotational position; and a second lead-in arm responsive to the motive force transmitted by said transmission means to rotate said first lead-in arm, whereby said pick-up arm is rotated about said pivot point P from an initial quiescent position to a predetermined position.

2. A pick-up arm assembly according to claim 1, wherein said transmission means includes a pulley having a cam surface, said pulley being driven by said motor means; and a friction member between said pulley and said pivot point rotating means to transfer rotation of said pulley to said rotating means, said second lead-in arm having a portion riding on said cam surface of said pulley to thereby rotate said first lead-in arm.

3. A pick-up arm assembly according to claim 2, further including an energizable plunger solenoid for urging said portion of said second lead-in arm to said cam surface of said pulley, stop means actuated to stop the rotation of said first lead-in arm at said predetermined rotational position in response to the energization of said plunger solenoid, means for deenergizing said plunger solenoid after said first lead-in arm has been stopped by said stop means, and means responsive to the deenergization of said plunger solenoid for returning said second lead-in arm to an initial position thereof.

4. A pick-up arm assembly for controlling the reproduction of signals by a stylus from a pre-recorded record disc, the record disc having an initial recorded portion and a terminal recorded portion, comprising: a pick-up arm; a pivotable arm support member for pivotably supporting said pick-up arm at a single pivot point to enable said pick-up arm to scan across the surface of said record disc; means for rotating said pivot point about an axis; a stylus holding member mounted on said pick-up arm for holdinng said stylus; detecting means for detecting deviations in the position of said pick-up arm with said stylus holding member mounted thereon from a predetermined position during signal reproduction; position adjust means including motor means to drive said pivot point rotating means for adjusting the position of said pick-up arm during signal reproduction to cancel said deviations; and means for limiting the scanning range of said pick-up arm to a confined portion substantially less than the entire surface of said record disc, including: lead-in memory means for selectively establishing a lead-in position on said record disc for said stylus, said lead-in position being intermediate said initial and terminal recorded portions of said record disc; lead-out memory means for selectively establishing a lead-out position on said record disc for said stylus, said lead-out position being intermediate said lead-in position and said terminal recorded portion of said record disc; and stopper means mechanically connected to and rotatable with said pivot point rotating means, said stopper means being constrained between said lead-in and said lead-out memory means to correspondingly limit the movement of said pick-up arm.

5. A pick-up arm assembly for controlling the reproduction of signals by a stylus from a pre-recorded record disc, the record disc having an initial recorded portion and a terminal recorded portion, comprising: a pick-up arm; a pivotable arm support member for pivotably supporting said pick-up arm at a single pivot point to enable said pick-up arm to scan across the surface of said record disc; means for rotating said pivot point about an axis; a stylus holding member mounted on said pick-up arm for holding said stylus; detecting means for detecting deviations in the position of said pick-up arm with said stylus holding member mounted thereon from a predetermined position during signal reproduction; position adjust means including motor means to drive said pivot point rotating means for adjusting the position of said pick-up arm during signal reproduction to cancel said deviations; and means for limiting the scanning range of said pick-up arm to a confined portion substantially less than the entire surface of said record disc, including: a lead-in memory member for selectively establishing a lead-in position on said record disc for said stylus, said lead-in position being intermediate said initial and terminal recorded portions of said record disc; said lead-in memory member comprising a first rotatable member having a first abutment thereon; a lead-out memory member for selectively establishing a lead-out position on said record disc for said stylus, said lead-out position being intermediate said lead-in position and said terminal recorded portion of said record disc; said lead-out memory member comprising a second rotatable member having a second abutment thereon; stopper means mechanically connected to and rotatable with said pivot point rotating means, said first and second abutments defining an arcuate path for movement of said stopper means to correspondingly limit the movement of said pick-up arm; first restraining means for selectively restraining the rotation of said first rotatable member so that said first abutment defines said leadin position; and second restraining means for selectively restraining the rotation of said second rotatable member so that said second abutment defines said lead-out postion.

6. A pick-up arm assembly according to claim 5, including means for detecting that said stopper means abuts said second abutment; and means responsive to said means for detecting for driving said motor in a reverse direction to reversely drive said pivot rotating means for moving said pick-up arm to a start position.

7. A pick-up arm assembly according to claim 5, wherein said first abutment and said second abutment are biased so as to nip said stopper means therebetween when said first and second restraining means do not restrain said first and second rotatable members.

8. A pick-up arm assembly for controlling the position of a stylus for reproducing signals previously recorded on a record disc, comprising: a pick-up arm, a pivotable arm support member for pivotably supporting said pick-up arm at a single pivot point P; means for rotating said pivot point P about an axis C; a stylus holding member mounted on said pick-up arm for holding a stylus S, the stylus holding member having a longitudinal axis which defines a constant angle $\theta$ with a line PS defined by said pivot point P and said stylus S; photodetecting means disposed at a predetermined point X for detecting if an extension of said line PS intersects said point X, said photodetecting means producing a first signal when said extension of said line PS has rotated in one direction past said point X, a second signal when said extension of said line PS has rotated in a second direction past said point X, and a third signal when said extension of said line PS is within a predetermined vicinity of said point X; bidirectional motor means for bidirectionally driving said pivot point rotating means in a direction to restore said extension of said line PS to within said predetermined vicinity of said point X; motor control means coupled to said photodetecting means for selectively energizing said motor means in response to said first and second signals; timing means for determining the time duration of at least one of said first and second signals and for producing a reset output signal when said time duration exceeds a predetermined amount indicative of the movement of said pick-up arm to an ending portion of said record disc; and means responsive to said reset output signal for causing said stylus to be lifted from said record disc and to energize said motor in a direction such that said pivot point rotating means is driven to return said pick-up arm to a quiescent position.

* * * * *